(12) United States Patent
Yamada

(10) Patent No.: US 11,592,682 B2
(45) Date of Patent: Feb. 28, 2023

(54) DISPLAY APPARATUS

(71) Applicant: SEIKO EPSON CORPORATION, Tokyo (JP)

(72) Inventor: Fumika Yamada, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 236 days.

(21) Appl. No.: 17/032,304

(22) Filed: Sep. 25, 2020

(65) Prior Publication Data

US 2021/0096386 A1 Apr. 1, 2021

(30) Foreign Application Priority Data

Sep. 27, 2019 (JP) .............................. JP2019-176603

(51) Int. Cl.
| | |
|---|---|
| *G02B 27/48* | (2006.01) |
| *G02B 26/08* | (2006.01) |
| *G02B 27/00* | (2006.01) |
| *F21V 8/00* | (2006.01) |
| *G02B 27/01* | (2006.01) |

(52) U.S. Cl.
CPC .......... *G02B 27/48* (2013.01); *G02B 6/0016* (2013.01); *G02B 6/0036* (2013.01); *G02B 26/0833* (2013.01); *G02B 27/0081* (2013.01); *G02B 27/0172* (2013.01); *G02B 2027/0178* (2013.01)

(58) Field of Classification Search
None
See application file for complete search history.

(56) References Cited

U.S. PATENT DOCUMENTS

| | | | | |
|---|---|---|---|---|
| 2008/0192259 A1* | 8/2008 | Sumiyama | ............... | G03H 1/28 372/92 |
| 2009/0251883 A1* | 10/2009 | Yamasaki | ............. | H01S 5/0087 362/84 |
| 2014/0168260 A1* | 6/2014 | O'Brien | ................... | G02B 6/00 385/134 |
| 2016/0124229 A1* | 5/2016 | Yokoyama | ......... | G02B 27/4205 385/37 |
| 2017/0131552 A1* | 5/2017 | Yokoyama | ........... | G02B 5/1866 |
| 2017/0299860 A1 | 10/2017 | Wall et al. | | |
| 2018/0067325 A1* | 3/2018 | Yonekubo | ............ | G02B 5/1814 |
| 2018/0067326 A1* | 3/2018 | Yonekubo | .............. | G02B 17/08 |

FOREIGN PATENT DOCUMENTS

EP 1731943 A1 * 12/2006 ............. G02B 13/18

* cited by examiner

*Primary Examiner* — Elmito Breval
(74) *Attorney, Agent, or Firm* — Oliff PLC

(57) ABSTRACT

A display apparatus includes an image light generating unit that includes a laser light source unit and a MEMS mirror configured to reflect laser light emitted from the laser light source unit, and that is configured to generate image light, an exit pupil expander configured to expand a luminous flux diameter of the image light from the image light generating unit, a light-guiding plate, a first surface relief-type diffraction grating provided at a light incidence portion of the light-guiding plate and on which the image light passing through the exit pupil expander is incident and enters the light-guiding plate, and a second surface relief-type diffraction grating provided at a light emission portion of the light-guiding plate and through which the image light propagating inside the light-guiding plate exits, in which the image light generating unit includes a speckle noise reduction section configured to reduce speckle noise in the image light.

8 Claims, 18 Drawing Sheets

DISPLAY APPARATUS

The present application is based on, and claims priority from JP Application Serial Number 2019-176603, filed Sep. 27, 2019, the disclosure of which is hereby incorporated by reference herein in its entirety.

BACKGROUND

1. Technical Field

The present disclosure relates to a display apparatus.

2. Related Art

In recent years, a wearable display apparatus such as a head-mounted display have attracted attention. As such a display apparatus, there is a technology in which an incidence side diffraction element and an emission side diffraction element formed on a surface of a light-guiding plate are provided, where image light captured from the incidence side diffraction element into a light-guiding body is caused to propagate and to be extracted from the emission side diffraction element to an outside, to thus display a virtual image (for example, see US 2017/0299860 A).

In the display apparatus described above, a light beam emitted from an image generating unit constituted by a laser light source and a MEMS mirror is caused to be incident on an exit pupil expander, to thus expand a range of pupil position at which the image light can be observed.

Unfortunately, in the display apparatus described above, in the process where the exit pupil expander expands an angular distribution of the image light, the exit pupil expander as is becomes a scattering source to generate a speckle noise, resulting in a deterioration of image quality.

SUMMARY

In order to resolve the above-described issue, a display apparatus according to a first aspect of the present disclosure includes an image light generating unit including a laser light source unit and a MEMS mirror configured to reflect laser light emitted from the laser light source unit, the image light generating unit being configured to generate image light, an exit pupil expander configured to expand a luminous flux diameter of the image light from the image light generating unit, a light-guiding plate, a first surface relief-type diffraction grating provided at a light incidence portion of the light-guiding plate and on which the image light passing through the exit pupil expander is incident and enters the light-guiding plate, and a second surface relief-type diffraction grating provided at a light emission portion of the light-guiding plate and through which the image light propagating inside the light-guiding plate exits, in which the image light generating unit includes a speckle noise reduction section configured to reduce speckle noise in the image light.

The speckle noise reduction section may include a high-frequency wave superimposing circuit configured to perform a high-frequency wave superimposing process on the laser light source unit.

The speckle noise reduction section may include a temperature adjustment device configured to perform temperature adjustment on the laser light source unit.

A display apparatus according to a second aspect of the present disclosure includes an image light generating unit including a laser light source unit and a MEMS mirror, the laser light source unit being configured to emit image light composed of laser light and the MEMS mirror being configured to reflect the image light, an exit pupil expander configured to expand a luminous flux diameter of the image light from the image light generating unit, a movement device configured to cause the exit pupil expander to move, a light-guiding plate, an incidence side diffraction element provided at a light incidence portion of the light-guiding plate and on which the image light passing through the exit pupil expander is incident and enters the light-guiding plate, and an emission side diffraction element provided at a light emission portion of the light-guiding plate and through which the image light propagating inside the light-guiding plate exits.

The image light generating unit may be configured to control an output of the laser light emitted from the laser light source unit based on information about a rotation angle of the MEMS mirror.

The laser light source unit may be configured to include a plurality of laser light sources configured to emit the laser light in an identical wavelength.

The laser light source unit may be configured to include a plurality of laser light sources configured to emit the laser light in different wavelengths.

The laser light source unit may be a self-oscillating laser.

DESCRIPTION OF EXEMPLARY EMBODIMENTS

Figure 1:
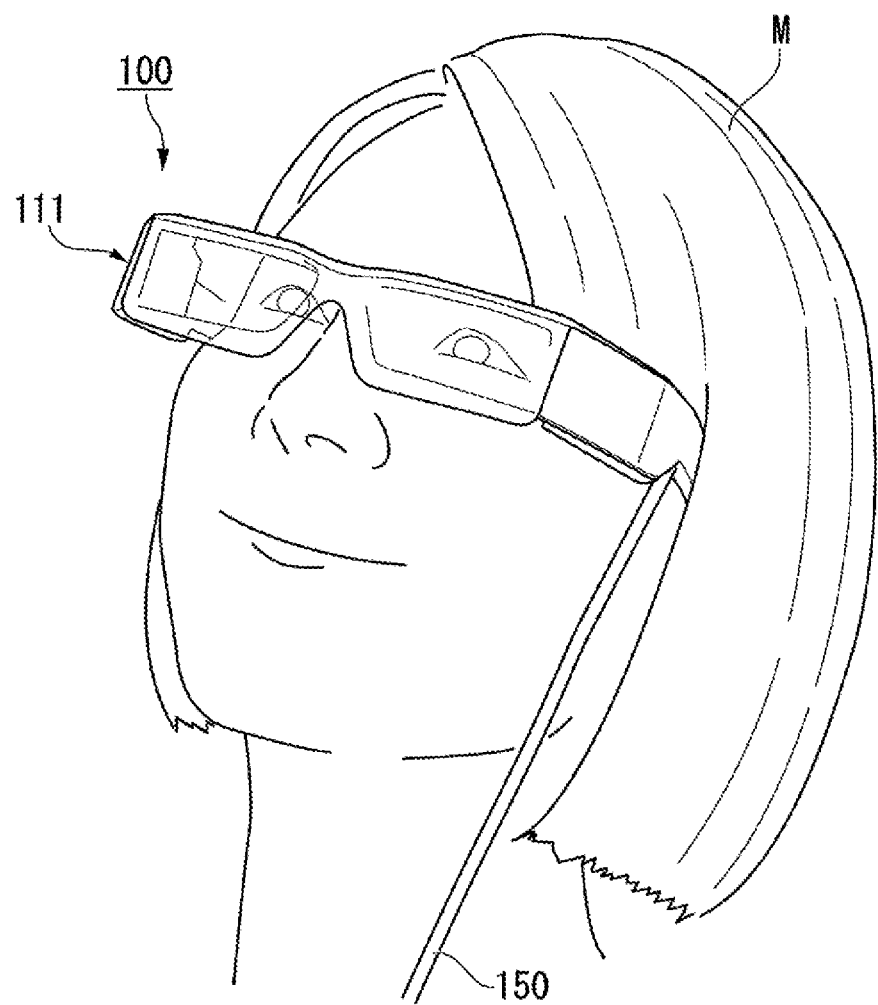
FIG. 1 is a view illustrating a state where an observer wears a display apparatus of a first embodiment.

Hereinafter, embodiments of the present disclosure will be described in detail with reference to the accompanying drawings.

Note that, in the drawings used for the following descriptions, characteristic portions are expanded for convenience to make characteristics easily comprehensible in some cases, thus dimension ratios among respective constituent elements or the like are not necessarily the same as actual dimension ratios.

First Embodiment

A display apparatus of the first embodiment is a head-mounted display of a see-through type that makes an image viewable along with an external world. That is, the display apparatus allows an observer to recognize the image being a virtual image, and allows the observer to observe an external world image as see-through light.

Figure 2:
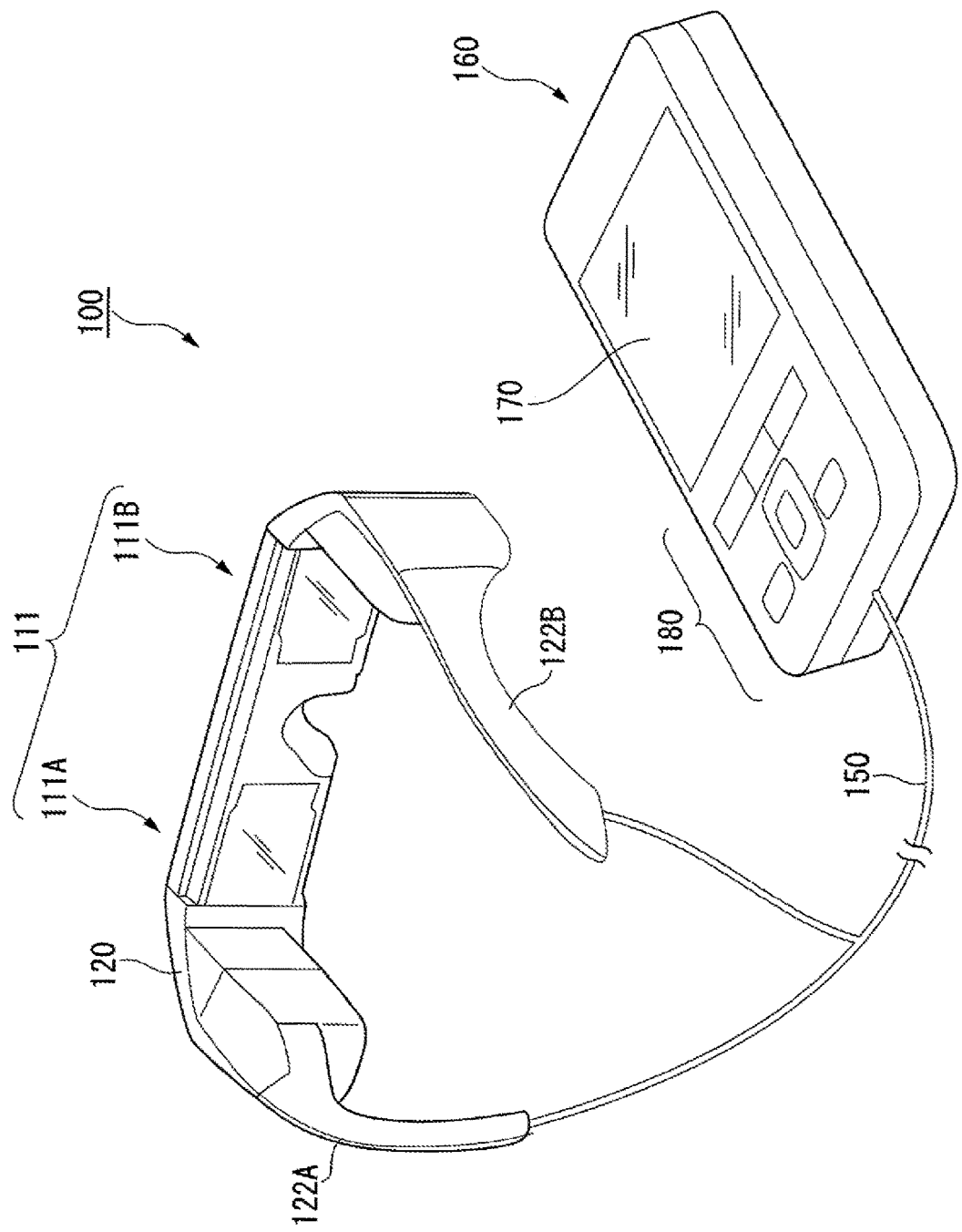
FIG. 2 is a perspective view of a display apparatus.

FIG. 1 is a view illustrating a state where the observer wears the display apparatus of the first embodiment. FIG. 2 is a perspective view of the display apparatus of the first embodiment.

As illustrated in FIG. 1, an observer M uses a display apparatus 100 of the first embodiment, while wearing the apparatus on the head, as in a case of wearing glasses.

As illustrated in FIG. 2, the display apparatus 100 includes a display unit 111 having a shape similar to glasses, and a controller 160 having a size to a degree of allowing the observer to hold this with a hand. The display unit 111 and the controller 160 are communicatively connected to each other, by wire, or wirelessly. In the first embodiment, each of an image display unit for left eye 111A and an image display unit for right eye 111B constituting the display unit 111, is communicatively connected to the controller 160 by wire via a cable 150, and those components communicate an image signal, a control signal, and the like.

The display unit 111 includes a main frame 120, the image display unit for left eye 111A, and the image display unit for right eye 111B. The controller 160 includes a display screen unit 170, and an operation button unit 180.

For example, the display screen unit 170 displays various types of information, commands, and the like that are provided to the observer. The main frame 120 includes a pair of temple portions 122A and 122B to be hung on ears of the observer. The main frame 120 is a member for supporting the image display unit for left eye 111A and the image display unit for right eye 111B.

The image display unit for right eye 111B has a configuration as in the image display unit for left eye 111A, and constituent elements inside both of the display units 111 are symmetrically arranged. Accordingly, in the following, a description of the image display unit for left eye 111A will be given, simply as an image display unit 112, in detail, while a description of the image display unit for right eye 111B will be omitted.

Figure 3:
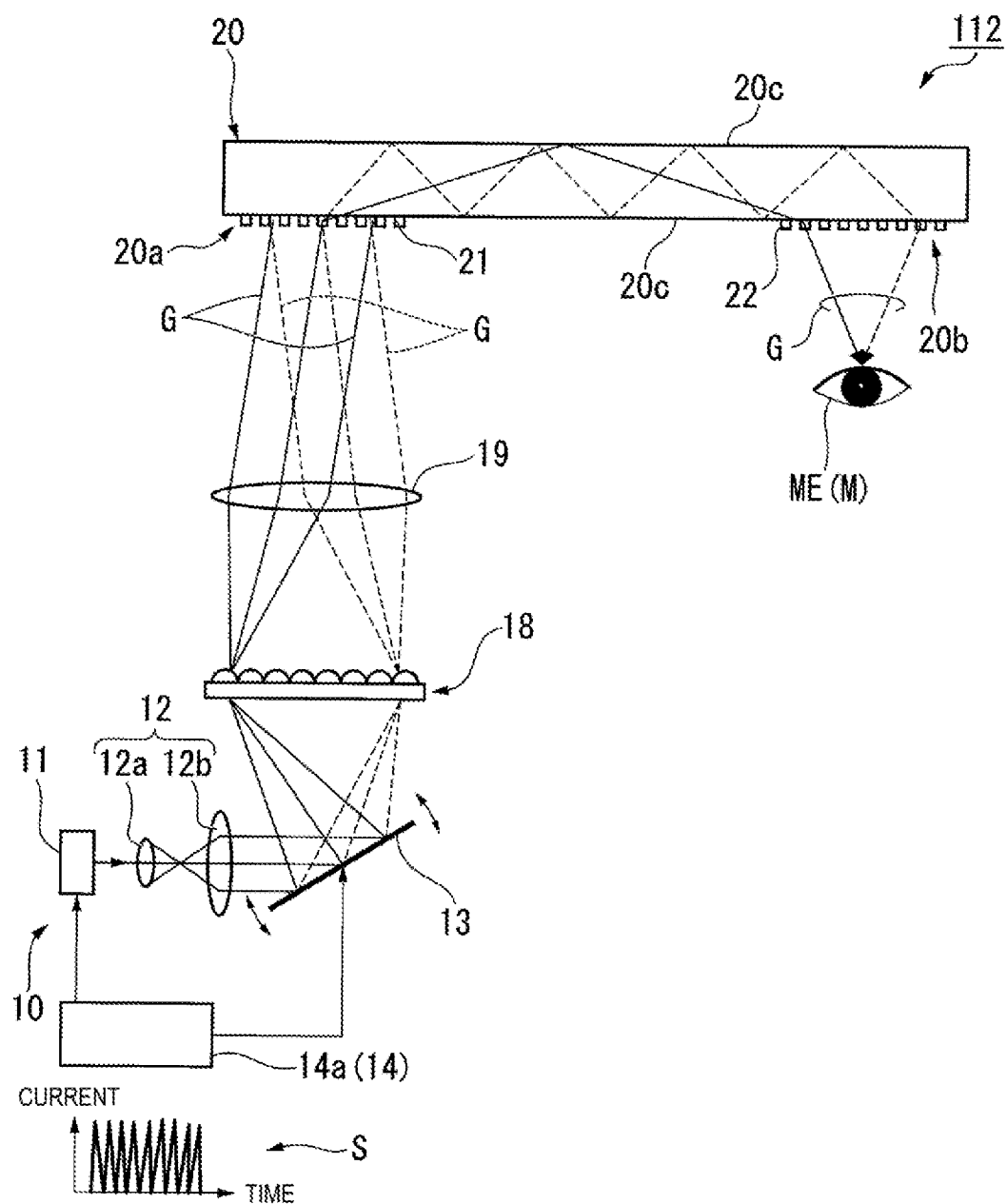
FIG. 3 is a horizontal cross-sectional diagram illustrating a schematic configuration of an image display unit.

FIG. 3 is a horizontal cross-sectional diagram illustrating a schematic configuration of an image display unit.

As illustrated in FIG. 3, the image display unit 112 includes an image light generating unit 10, an exit pupil expander 18, a relay lens 19, a light-guiding plate 20, an incidence side diffraction element 21, and an emission side diffraction element 22.

The image light generating unit 10 includes a laser light source unit 11, a light converging optical system 12, a MEMS mirror 13, and a driving circuit unit 14. The laser light source unit 11 serves as a semiconductor laser configured to emit laser light of a single wavelength. In the first embodiment, the laser light source unit 11 is configured to emit laser light of a single color, for example. The light converging optical system 12 is configured to guide light emitted from the laser light source unit 11 to the MEMS mirror 13. The light converging optical system 12 is constituted by two lenses 12a and 12b.

The MEMS mirror 13 is constituted by a micromirror. The MEMS mirror 13 is configured to rotate about a predetermined rotation axis, to thus reflect laser light passing through the light converging optical system 12 and cause the laser light to be incident on the exit pupil expander 18. The driving circuit unit 14 controls driving of the laser light source unit 11 and a rotation angle of the MEMS mirror 13. The driving circuit unit 14 is constituted by an analog circuit, or a digital circuit using a CPU, an FPGA, an ASIC, or the like, for example.

The image light generating unit 10 scans laser light emitted from the laser light source unit 11 with the MEMS mirror 13 to thus generate image light G of a single color (for example, green color) and cause the image light G to be incident on the light-guiding plate 20, in time sequence. This allows the image light G to be incident on the light-guiding plate 20 in a state where the image light G has a predetermined amplitude (vibration angle). Note that the laser light source unit 11 configured to emit laser light of a red, green, and blue color may be used to generate image light of a full color.

The exit pupil expander 18 is constituted by a microlens array, a diffractive optical element, a diffusion plate, or the like, for example. The exit pupil expander 18 emits the laser light reflected by the MEMS mirror 13 while expanding a beam diffusion angle of the laser light.

The image light generating unit 10 of the first embodiment causes the exit pupil expander 18 and the relay lens 19 to expand a luminous flux diameter of the image light G, to thus expand a size of an exit pupil formed with the image light G. This makes it possible to expand a range of pupil position of an eye ME of the observer M that can observe the image light G.

Here, ideally, it is desirable to produce the exit pupil expander 18 described above with high accuracy. For example, in the exit pupil expander 18, when constituted by the microlens array, fine concave-convex structures are formed at joints between lenses, and the like, actually influenced by a manufacturing error as well. Such fine concave-convex structures serve as a scattering source of the laser light. As a result, scattered light may cause an interference on a retina of eye to generate a speckle noise, resulting in a deterioration of image quality.

In contrast, the image light generating unit 10 of the first embodiment includes a high-frequency wave superimposing circuit 14a as a means configured to reduce high coherence at the laser light source unit 11. The high-frequency wave superimposing circuit 14a is included in the driving circuit unit 14. As a basic characteristic of the semiconductor laser, it is known that a laser oscillation state becomes unstable until several nanoseconds after a current is applied, and a multi-mode oscillation state as in an LED is established even with a single mode laser.

The high-frequency wave superimposing circuit 14a is, for example, configured to superimpose a high-frequency wave signal S of from 200 to 500 MHz on a driving current of the semiconductor laser that constitutes the laser light source unit 11, to thus maintain the multi-mode oscillation state. This makes it possible to reduce a coherence of the laser light compared to a single-mode laser that does not perform a high-frequency wave superimposing process.

As such, according to the image light generating unit 10 of the first embodiment, the image light G with reduced coherence by being superimposed with a high-frequency wave signal is incident on the exit pupil expander 18, to thus reduce the generation of the speckle noise, in the image light G, due to passing through the exit pupil expander 18. That is, in the image light generating unit 10 of the first embodiment, the high-frequency wave superimposing circuit 14a functions as a speckle noise reduction section configured to reduce the speckle noise in the image light G.

The light-guiding plate 20 of the first embodiment includes a transparent optical glass. Note that a transparent optical plastic may also be used for the light-guiding plate 20, and a cyclic polyolefin polymer resin, an acrylic resin, a polycarbonate, or the like can be used as well.

The light-guiding plate 20 includes a light incidence portion 20a and a light emission portion 20b. The incidence side diffraction element 21 is provided at the light incidence portion 20a of the light-guiding plate 20. The emission side diffraction element 22 is provided at the light emission portion 20b of the light-guiding plate 20.

The incidence side diffraction element 21 is configured to diffract the image light G to cause the image light G to enter the light-guiding plate 20. The light-guiding plate 20 is configured to cause the image light G introduced to the inside to propagate by total reflection, as described below. In the first embodiment, the image light G propagates in the left/right direction inside the light-guiding plate 20, for example. The emission side diffraction element 22 extracts the image light G propagating by total reflection inside the light-guiding plate 20 and guides the image light G to the eye ME of the observer M. The image light G is visually recognized as a virtual image by the eye ME of the observer M.

In the first embodiment, the incidence side diffraction element (a first surface relief-type diffraction grating) 21 is constituted by a surface relief-type diffraction grating. The emission side diffraction element (a second surface relief-type diffraction grating) 22 is constituted by the surface relief-type diffraction grating as well. The incidence side diffraction element 21 and the emission side diffraction element 22 constituted by the surface relief-type diffraction grating can maintain high diffraction efficiency over a wide angle range.

Figure 4:
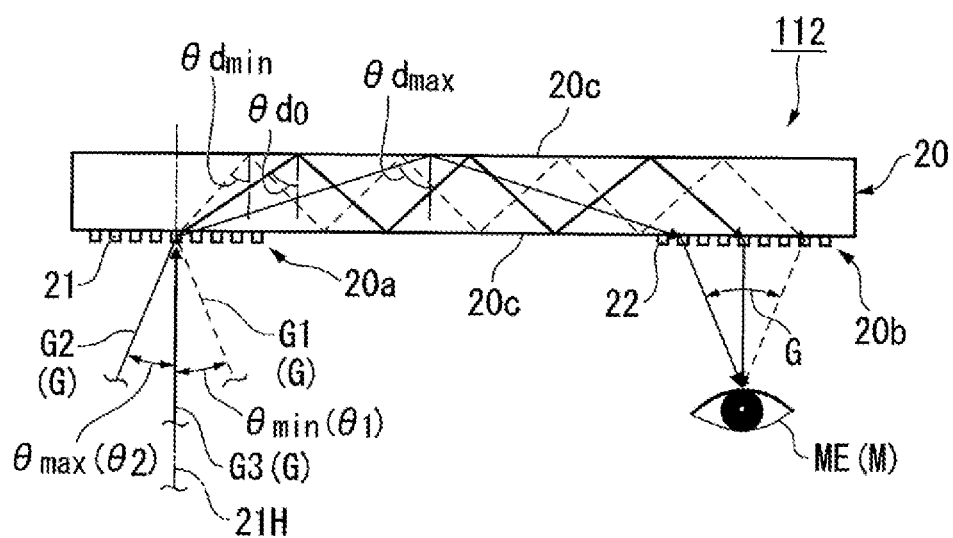
FIG. 4 is a cross-sectional diagram illustrating a propagation of light in a light-guiding plate.

FIG. 4 is a cross-sectional diagram illustrating a propagation of light in the light-guiding plate 20. In FIG. 4, the image light G being incident on the light-guiding plate 20 is illustrated only by main light rays, for the sake of simplicity of the figure.

As illustrated in FIG. 4, the image light G is incident on the incidence side diffraction element 21 of the light-guiding plate 20 within an angle range of an incidence angle of from $\theta_1$ to $\theta_2$. Here, the incidence angle of $\theta_1$, in the image light G being incident on the incidence side diffraction element 21, is the largest in absolute value among the incidence angles with respect to a normal line 21H of the incidence side diffraction element 21 of light rays that are incident in a direction approximating the emission side diffraction element 22. The incidence angle of $\theta_2$, in the image light G being incident on the incidence side diffraction element 21, is the largest in absolute value among the incidence angles with respect to the normal line 21H of the incidence side diffraction element 21 of light rays that are incident in a direction separating from the emission side diffraction element 22.

It is assumed that the incidence angle of $\theta_1$ and the incidence angle of $\theta_2$ are positive in the clockwise direction with respect to the normal line 21H of the incidence side diffraction element 21. Accordingly, the incidence angle of $\theta_1$ has the same absolute value as the incidence angle of $\theta_2$, where the incidence angle of $\theta_1$, which is in the counterclockwise direction with respect to the normal line 21H, is a negative value, while the incidence angle of $\theta_2$, which is in the clockwise direction with respect to the normal line 21H, is a positive value.

Hereinafter, the incidence angle of $\theta_1$ may be referred to as "minimum incidence angle of $\theta_{min}$", and the incidence angle $\theta_2$ may be referred to as "maximum incidence angle of $\theta_{max}$", for the sake of convenience.

The image light G being diffracted by the incidence side diffraction element 21 and then entering the light-guiding plate 20 is totally reflected by a surface 20c of the light-guiding plate 20 to propagate at a predetermined propagation angle inside the light-guiding plate 20. Here, the propagation angle at which the image light G propagates refers to an incidence angle by which the image light G is incident on the surface 20c of the light-guiding plate 20.

The image light G1 being incident on the incidence side diffraction element 21 at the minimum incidence angle of $\theta_{min}$ is diffracted by the incidence side diffraction element 21 to propagate at a minimum propagation angle of $\theta d_{min}$ inside the light-guiding plate 20. In the first embodiment, the minimum propagation angle $\theta d_{min}$ is set greater than a critical angle of the light-guiding plate 20, where the image light G1 propagates while being totally reflected inside the light-guiding plate 20. The image light G1 propagates at the minimum propagation angle $\theta d_{min}$ inside the light-guiding plate 20 in a state of being upright with respect to the surface 20c of the light-guiding plate 20.

Further, image light G2 being incident on the incidence side diffraction element 21 at the maximum incidence angle of $\theta_{max}$ is diffracted by the incidence side diffraction element 21 to propagate at a maximum propagation angle $\theta d_{max}$ inside the light-guiding plate 20. In the first embodiment, the maximum propagation angle $\theta d_{max}$ is set greater than the critical angle of the light-guiding plate 20, and thus the image light G1 propagates while being totally reflected inside the light-guiding plate 20. The image light G2 propagates at the maximum propagation angle $\theta d_{max}$ inside the light-guiding plate 20 in a state of being leaning to the surface 20c of the light-guiding plate 20.

Note that image light G3 being incident on the incidence side diffraction element 21 at an incidence angle of 0 degree that is between the minimum incidence angle of $\theta_{min}$ and the maximum incidence angle of $\theta_{max}$, is diffracted by the incidence side diffraction element 21 to propagate1, inside the light-guiding plate 20, at a propagation angle of $\theta d_0$ that is between the minimum propagation angle of $\theta d_{min}$ and the maximum propagation angle of $\theta d_{max}$. In the first embodiment, the propagation angle $\theta d_0$ is set greater than the critical angle of the light-guiding plate 20, where the image light G3 propagates while being totally reflected inside the light-guiding plate 20.

The image light G1 to G3 propagates while being totally reflected inside the light-guiding plate 20, and is then diffracted by the emission side diffraction element 22 to be extracted to an outside. In the first embodiment, a lattice period of the incidence side diffraction element 21 is equal to the lattice period of the emission side diffraction element 22. Accordingly, emission angles of the image light G1 to G3 emitted from the emission side diffraction element 22 are the same as incidence angles of the image light G1 to G3 being incident on the incidence side diffraction element 21, respectively. Thus, $\theta_{max}-\theta_{min}$ coincides with a view angle of the image light G for determining the size of the virtual image.

As described above, according to the image display unit 112 of the first embodiment, the high-frequency wave superimposing circuit 14a of the image light generating unit 10 functions as the speckle noise reduction section, to thus suppress the deterioration of image quality due to the speckle noise.

The image display unit 112 of the first embodiment also allows the exit pupil expander 18 to expand the size of the exit pupil formed with the image light G while suppressing the generation of the speckle noise. Thus, the display apparatus 100 including the image display unit 112 of the first embodiment is reliable enough to allow the eyes of the observer to visually recognize the image light G having high quality with reduced speckle noise in a wide range.

Second Embodiment

Next, the second embodiment of the present disclosure will be described.

The basic configuration of a display apparatus of the second embodiment is similar to that of the first embodiment except for the configuration of the image display unit. Hereinafter, a description of the image display unit will be given while a description of the overall configuration of the display apparatus is omitted. Note that configurations and members common to the first embodiment will be denoted by identical reference signs and the detailed description will be omitted.

Figure 5:
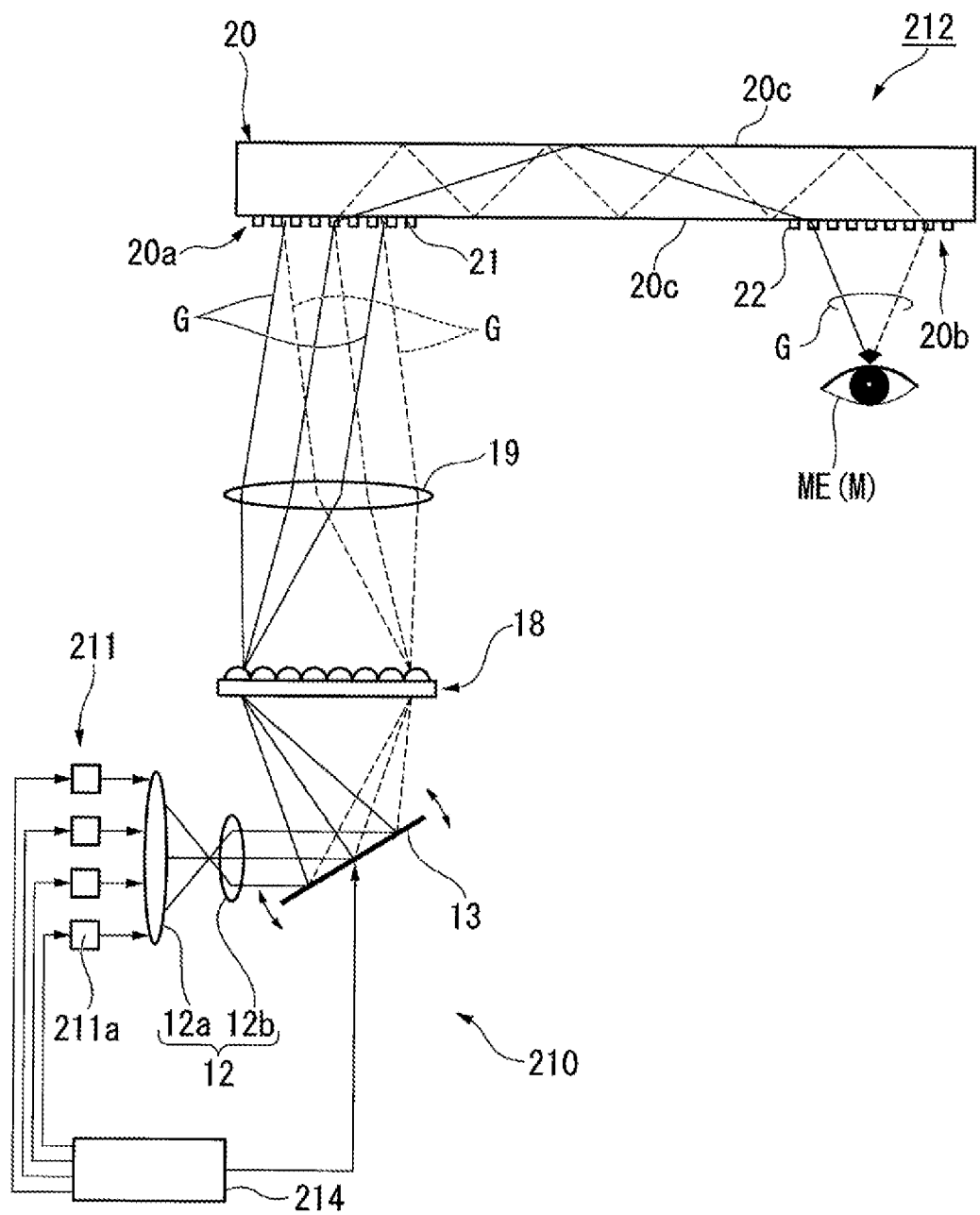
FIG. 5 is a horizontal cross-sectional diagram illustrating a schematic configuration of an image display unit of a second embodiment.

FIG. 5 is a horizontal cross-sectional diagram illustrating a schematic configuration of an image display unit of the second embodiment.

As illustrated in FIG. 5, an image display unit 212 of the second embodiment includes an image light generating unit 210, the exit pupil expander 18, the relay lens 19, the light-guiding plate 20, the incidence side diffraction element 21, and the emission side diffraction element 22.

The image light generating unit 210 includes a laser light source unit 211, the light converging optical system 12, the MEMS mirror 13, and a driving circuit unit 214. In the second embodiment, the driving circuit unit 214 includes a circuit for driving the laser light source unit 211 and controlling the rotation angle of the MEMS mirror 13, and does not include the high-frequency wave superimposing circuit described above.

Here, when a laser array light source is constituted by using laser elements independent to one another, a speckle contrast, which serves as an indication of the speckle noise, is multiplied by n to the power of $-\frac{1}{2}$ when n pieces of the laser elements are used, for example. A less value of the speckle contrast leads to a lowering of the visibility of the speckle noise. Accordingly, a greater number of the laser elements enables a reduction in the speckle noise.

The laser light source unit 211 of the second embodiment serves as the laser array light source constituted by using a plurality of semiconductor lasers 211a that are independent to one another. That is, the laser light source unit 211 has a structure in which the semiconductor lasers (laser light sources) 211a configured to emit laser light of a single wavelength (for example, green color) are arranged in an array-like form. Note that FIG. 5 illustrates only four pieces of the semiconductor lasers 211a, the semiconductor lasers 211a are provided by the number required to sufficiently reduce the speckle noise without being limited to four.

The lens 12a of the light converging optical system 12 is set to a size that can capture a bundle of rays emitted from the laser light source unit 211.

The image light generating unit 210 causes the MEMS mirror 13 to scan the bundle of rays composed of a plurality of laser light rays emitted from the laser light source unit 211, to thus generate the image light G of a single color (green color).

As such, the image light generating unit 210 of the second embodiment, which includes the laser light source unit 211 constituted by an array light source, can reduce the generation of the speckle noise in the image light G, compared to a case when a single semiconductor laser is used as the laser light source unit. That is, in the image light generating unit 210 of the second embodiment, an array light source structure by the laser light source unit 211 functions as the speckle noise reduction section configured to reduce the speckle noise in the image light G. Thus, the image light generating unit 210 of the second embodiment includes the speckle noise reduction section.

As described above, the image display unit 212 of the second embodiment, which includes the laser light source unit 211 composed of the array light source, can suppress the deterioration of image quality due to the speckle noise.

The image display unit 212 of the second embodiment also allows the exit pupil expander 18 to expand the size of the exit pupil formed with the image light G while suppressing the generation of the speckle noise.

Thus, the display apparatus including the image display unit 212 of the second embodiment allows the eyes of the observer to visually recognize the image light G having high quality with reduced speckle noise in a wide range.

First Modified Example

Next, the first modified example of the present disclosure will be described. This modified example is the first modified example related to the second embodiment. Hereinafter, configurations and members common to the second embodiment will be denoted by identical reference signs and the detailed description will be omitted.

Figure 6:
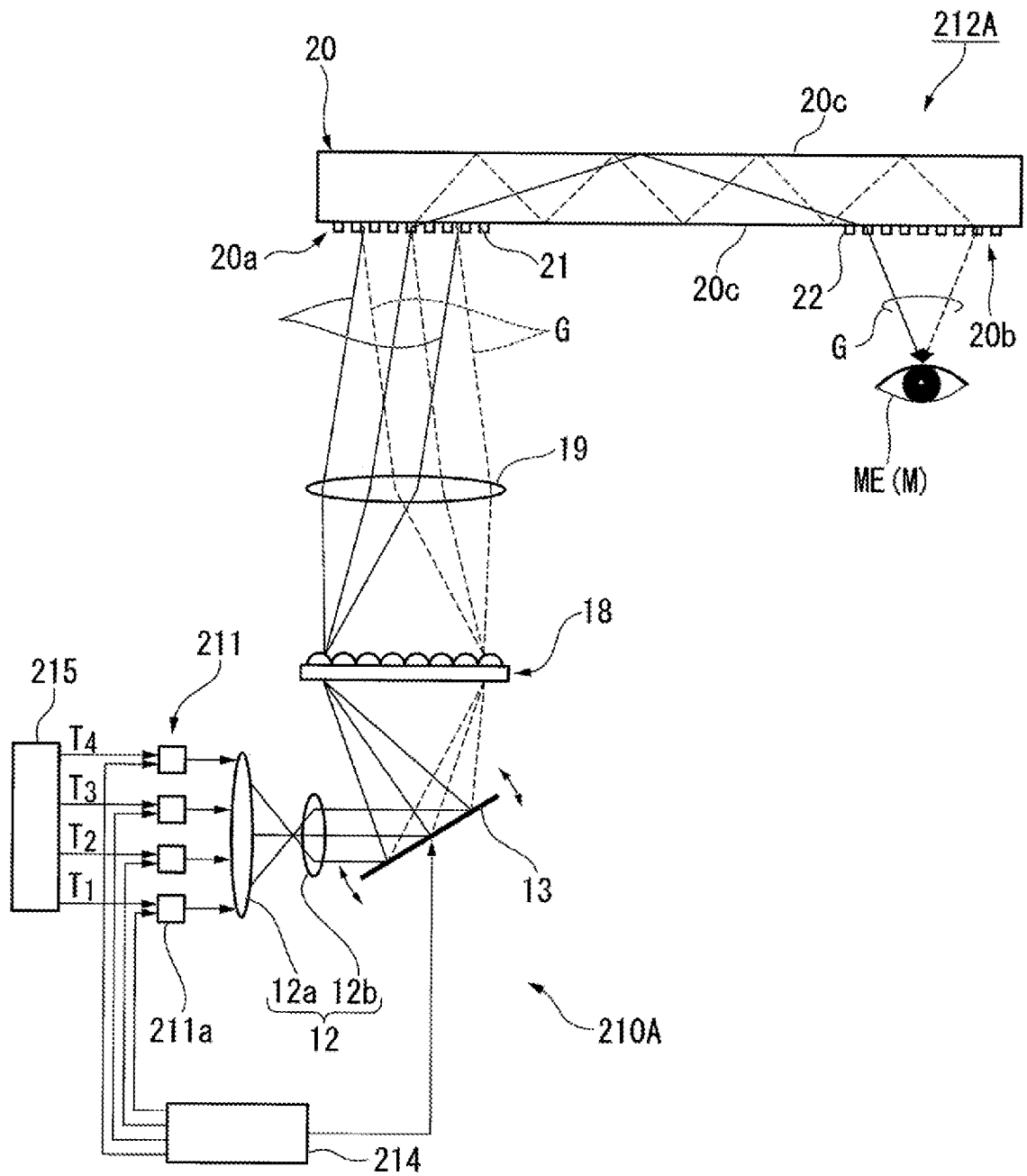
FIG. 6 is a horizontal cross-sectional diagram illustrating a schematic configuration of an image display unit of a first modified example.

FIG. 6 is a horizontal cross-sectional diagram illustrating a schematic configuration of an image display unit of the first modified example.

As illustrated in FIG. 6, an image display unit 212A of the first modified example includes an image light generating unit 210A, the exit pupil expander 18, the relay lens 19, the light-guiding plate 20, the incidence side diffraction element 21, and the emission side diffraction element 22.

The image light generating unit 210A includes the laser light source unit 211, the light converging optical system 12, the MEMS mirror 13, the driving circuit unit 214, and a temperature adjustment device 215. The temperature adjustment device 215 is configured to individually adjust the temperature of the semiconductor lasers 211a that constitute the laser light source unit 211.

Here, the semiconductor laser has a characteristic in which an oscillation wavelength shifts to a longer wavelength side when the temperature rises. The temperature adjustment device 215 gradually changes the temperature of the semiconductor laser 211a adjacent to this device.

The temperature adjustment device 215 sets the temperatures of the semiconductor lasers 211a to $T_1$, $T_2$, $T_3$, and $T_4$, for example. This makes it possible to shift the oscillation wavelength for each of the semiconductor lasers 211a. The speckle noise varies in pattern, such as particle size, depending on wavelength.

As such, according to the image light generating unit 210A of the first modified example, the oscillation wavelength is shifted for each of the semiconductor lasers 211a, to thus superimpose the speckle noise of different wavelengths on one another on the retina. This makes it possible to increase a randomness of the speckle noise and to further flatten the speckle noise. That is, in the image light generating unit 210A of the first modified example, the temperature adjustment device 215 functions as the speckle noise reduction section configured to reduce the speckle noise in the image light G.

Second Modified Example

Next, the second modified example of the present disclosure will be described. This modified example is the second modified example related to the second embodiment. Hereinafter, configurations and members common to the second embodiment will be denoted by identical reference signs and the detailed description will be omitted.

Figure 7:
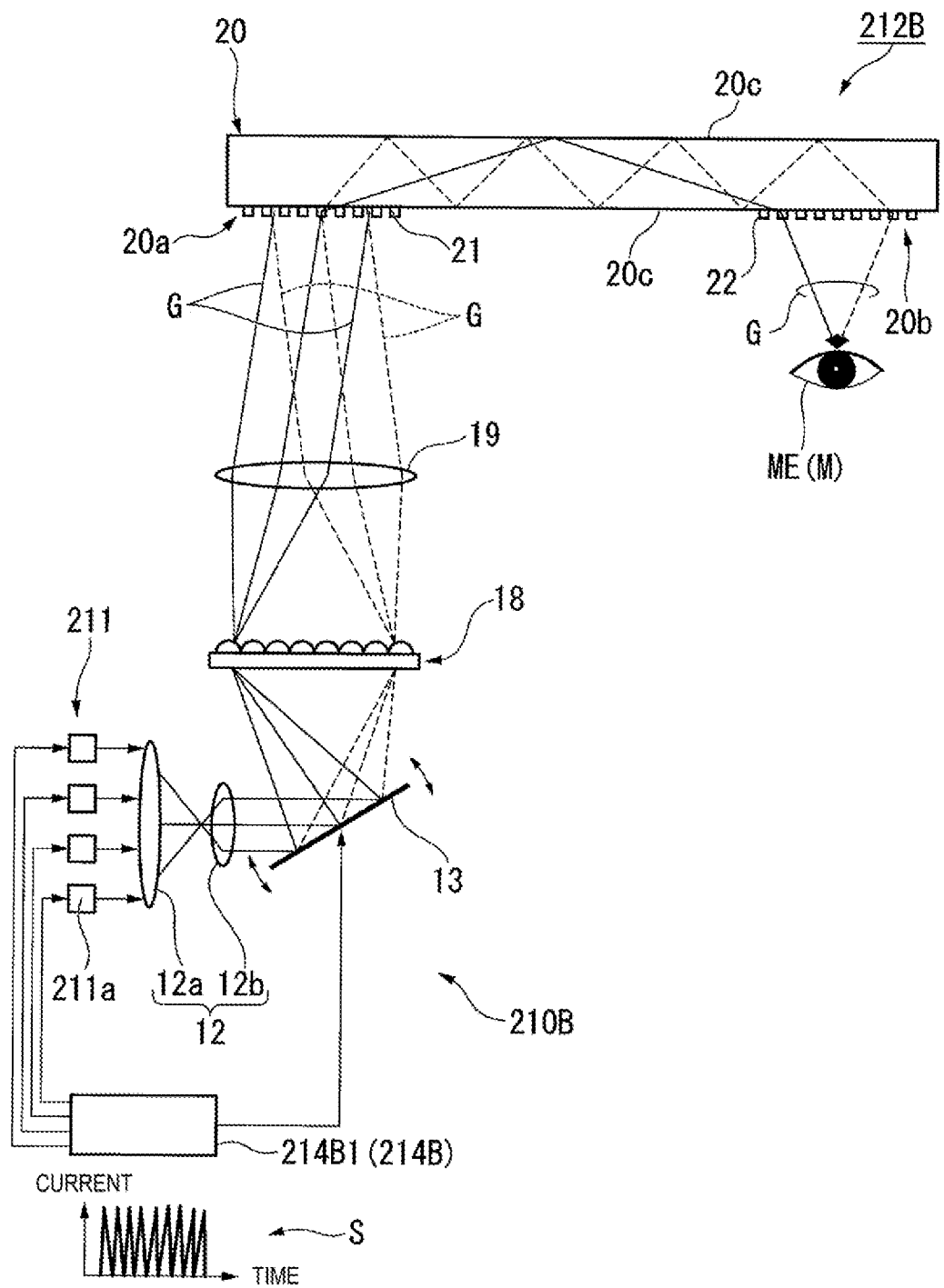
FIG. 7 is a horizontal cross-sectional diagram illustrating a schematic configuration of an image display unit of a second modified example.

FIG. 7 is a horizontal cross-sectional diagram illustrating a schematic configuration of an image display unit of the second modified example.

As illustrated in FIG. 7, an image display unit 212B of the second modified example includes an image light generating unit 210B, the exit pupil expander 18, the relay lens 19, the light-guiding plate 20, the incidence side diffraction element 21, and the emission side diffraction element 22.

The image light generating unit 210B includes the laser light source unit 211, the light converging optical system 12, the MEMS mirror 13, and a driving circuit unit 214B. The image light generating unit 210B of the second modified example includes a high-frequency wave superimposing circuit 214B1. The high-frequency wave superimposing circuit 214B1 is included in the driving circuit unit 214B. The high-frequency wave superimposing circuit 214B1 is configured to superimpose the high-frequency wave signal on driving currents of the semiconductor lasers 211a that constitute the laser light source unit 211.

According to the image light generating unit 210B of the second modified example, a synergistic effect due to speckle reduction by the laser light source unit 211 serving as the array light source and speckle reduction by multi-mode oscillation caused by high-frequency wave superimposing increases the randomness of the speckle noise and to further flatten the speckle noise, to thus reduce the speckle noise.

Third Modified Example

Next, the third modified example of the present disclosure will be described. This modified example is the third modified example related to the second embodiment, and has a configuration in which the first modified example is combined with the second modified example. Hereinafter, configurations and members common to the second embodiment will be denoted by identical reference signs and the detailed description will be omitted.

Figure 8:
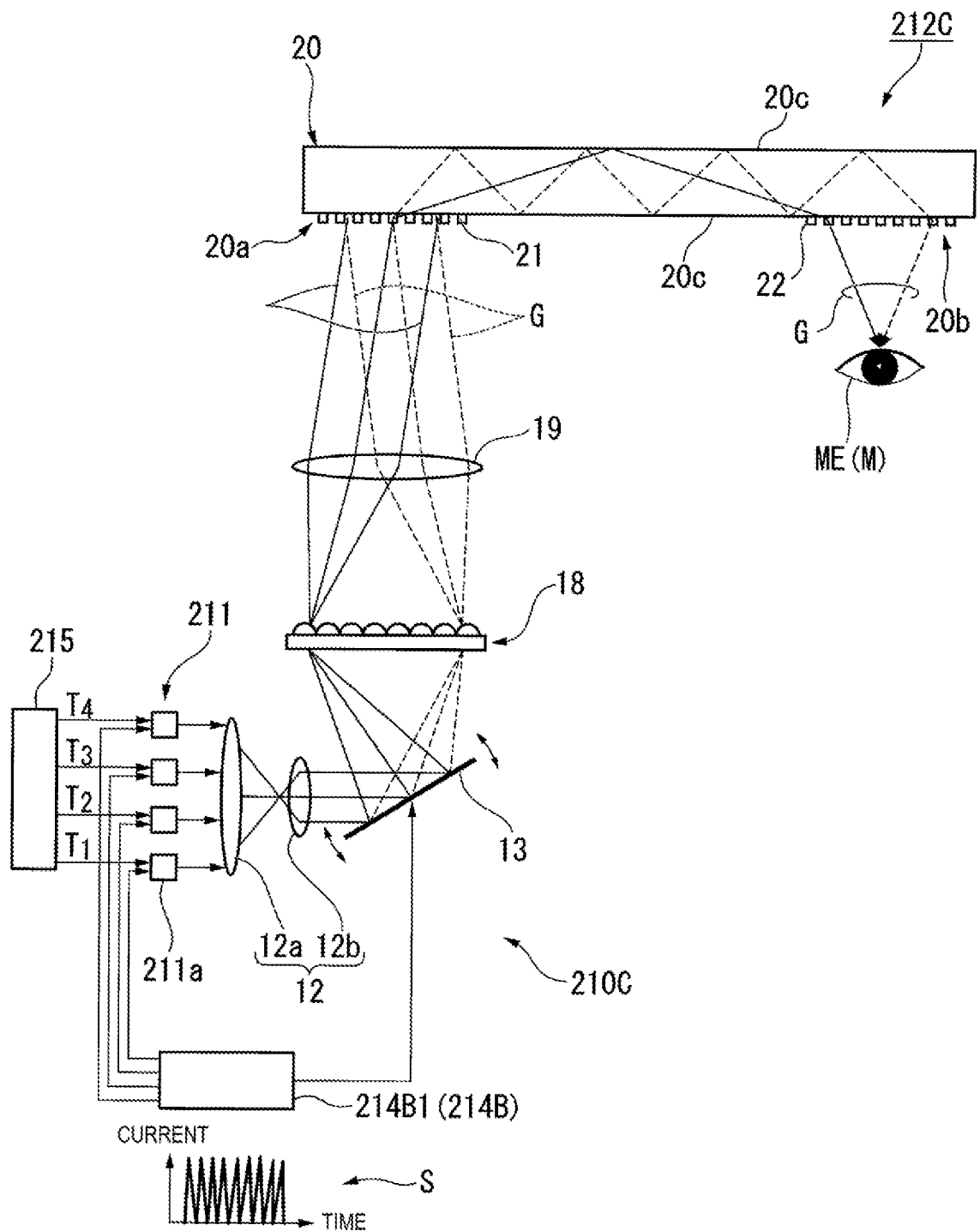
FIG. 8 is a horizontal cross-sectional diagram illustrating a schematic configuration of an image display unit of a third modified example.

FIG. 8 is a horizontal cross-sectional diagram illustrating a schematic configuration of an image display unit of the third modified example.

As illustrated in FIG. 8, an image display unit 212C of the third modified example includes an image light generating unit 210C, the exit pupil expander 18, the relay lens 19, the light-guiding plate 20, the incidence side diffraction element 21, and the emission side diffraction element 22. The image light generating unit 210C includes the laser light source unit 211, the light converging optical system 12, the MEMS mirror 13, the driving circuit unit 214B, and the temperature adjustment device 215.

According to the image light generating unit 210C of the third modified example, a synergistic effect due to speckle reduction by the array light source, the speckle reduction by the multi-mode oscillation caused by high-frequency wave superimposing, and speckle reduction by a wavelength shift due to a temperature adjustment increases the randomness of the speckle noise and to further flatten the speckle noise, to thus reduce the speckle noise.

Third Embodiment

Next, the third embodiment of the present disclosure will be described.

The basic configuration of a display apparatus of the third embodiment is similar to that of the first embodiment except for the configuration of the image display unit. Hereinafter, a description of the image display unit will be given while the description of the overall configuration of the display apparatus is omitted. Note that configurations and members common to the first embodiment will be denoted by identical reference signs and the detailed description will be omitted.

Figure 9:
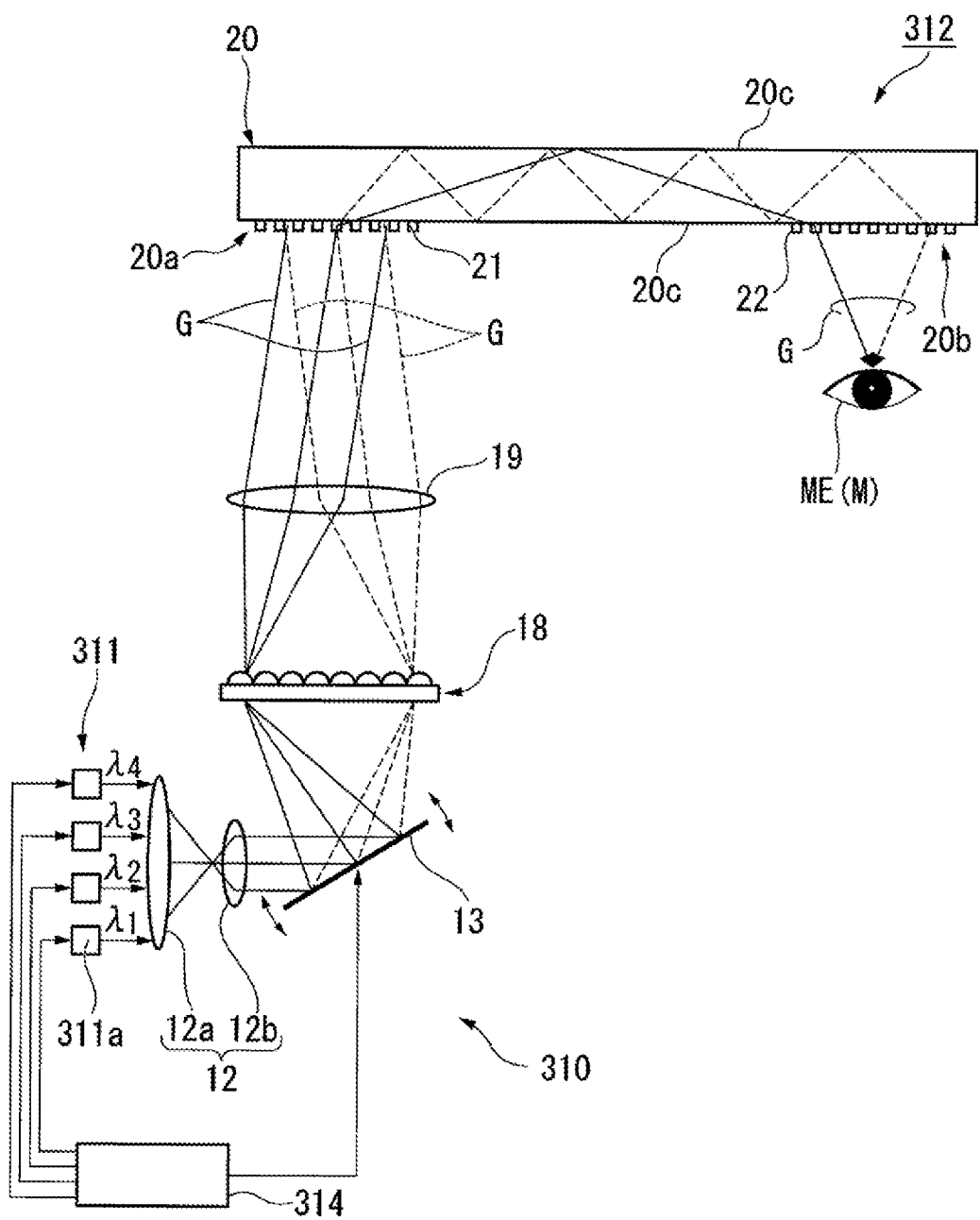
FIG. 9 is a horizontal cross-sectional diagram illustrating a schematic configuration of an image display unit of a third embodiment.

FIG. 9 is a horizontal cross-sectional diagram illustrating a schematic configuration of an image display unit of the third embodiment.

As illustrated in FIG. 9, an image display unit 312 of the third embodiment includes an image light generating unit 310, the exit pupil expander 18, the relay lens 19, the light-guiding plate 20, the incidence side diffraction element 21, and the emission side diffraction element 22.

The image light generating unit 310 includes a laser light source unit 311, the light converging optical system 12, the MEMS mirror 13, and a driving circuit unit 314. The laser light source unit 311 has a multi-wavelength array structure in which a plurality of semiconductor lasers 311a configured to emit laser light of mutually different wavelengths are arranged in an array-like form. Note that FIG. 9 illustrates only four pieces of the semiconductor lasers 311a, the number of the semiconductor lasers 311a is not limited to four.

The wavelength difference in the laser light emitted from the semiconductor lasers 311a is approximately equal to or greater than an oscillation wavelength difference generated by the temperature adjustment device described above. That is, although light emitted from the semiconductor lasers 311a differs in wavelength, the light is in overall light of an identical color (for example, green color light). The laser light source unit 311 emits light of wavelengths $\lambda_1$, $\lambda_2$, $\lambda_3$, and $\lambda_4$ from the semiconductor lasers 311a, for example.

The lens 12a of the light converging optical system 12 is set to a size that can capture the bundle of rays emitted from the laser light source unit 311.

The image light generating unit 310 is configured to cause the MEMS mirror 13 to scan the laser light emitted from the laser light source unit 311 to thus generate the image light G, and to cause the image light G to be incident on the light-guiding plate 20 in time sequence. This allows the image light G to be incident on the light-guiding plate 20 in a state of having a predetermined amplitude (vibration angle).

As described above, the speckle noise varies in pattern depending on wavelength. This allows the speckle patterns by the plurality of semiconductor lasers 311a having different wavelengths to be superimposed, to thus reduce the speckle noise.

That is, the image light generating unit 310 of the third embodiment, which shifts a wavelength of the laser light emitted from the semiconductor laser 311a, superimposes the speckle noise of different wavelengths on one another on the retina. This makes it possible to increase the randomness of the speckle noise and to further flatten the speckle noise. That is, in the image light generating unit 310 of the third embodiment, the multi-wavelength array structure of the laser light source unit 311 functions as the speckle noise reduction section configured to reduce the speckle noise in the image light G. Thus, the image light generating unit 310 of the third embodiment includes the speckle noise reduction section.

As described above, the image display unit 312 of the third embodiment, which includes the laser light source unit 311 composed of a multi-wavelength array light source, can suppress the deterioration of image quality due to the speckle noise.

The image display unit 312 of the third embodiment also allows the exit pupil expander 18 to expand the size of the exit pupil formed with the image light G while suppressing the generation of the speckle noise.

Thus, the display apparatus including the image display unit 312 of the third embodiment allows the eyes of the observer to visually recognize the image light G having high quality with reduced speckle noise in a wide range.

Fourth Modified Example

Next, the fourth modified example of the present disclosure will be described. This modified example is a modified example related to the third embodiment. Hereinafter, configurations and members common to the third embodiment will be denoted by identical reference signs and the detailed description will be omitted.

Figure 10:
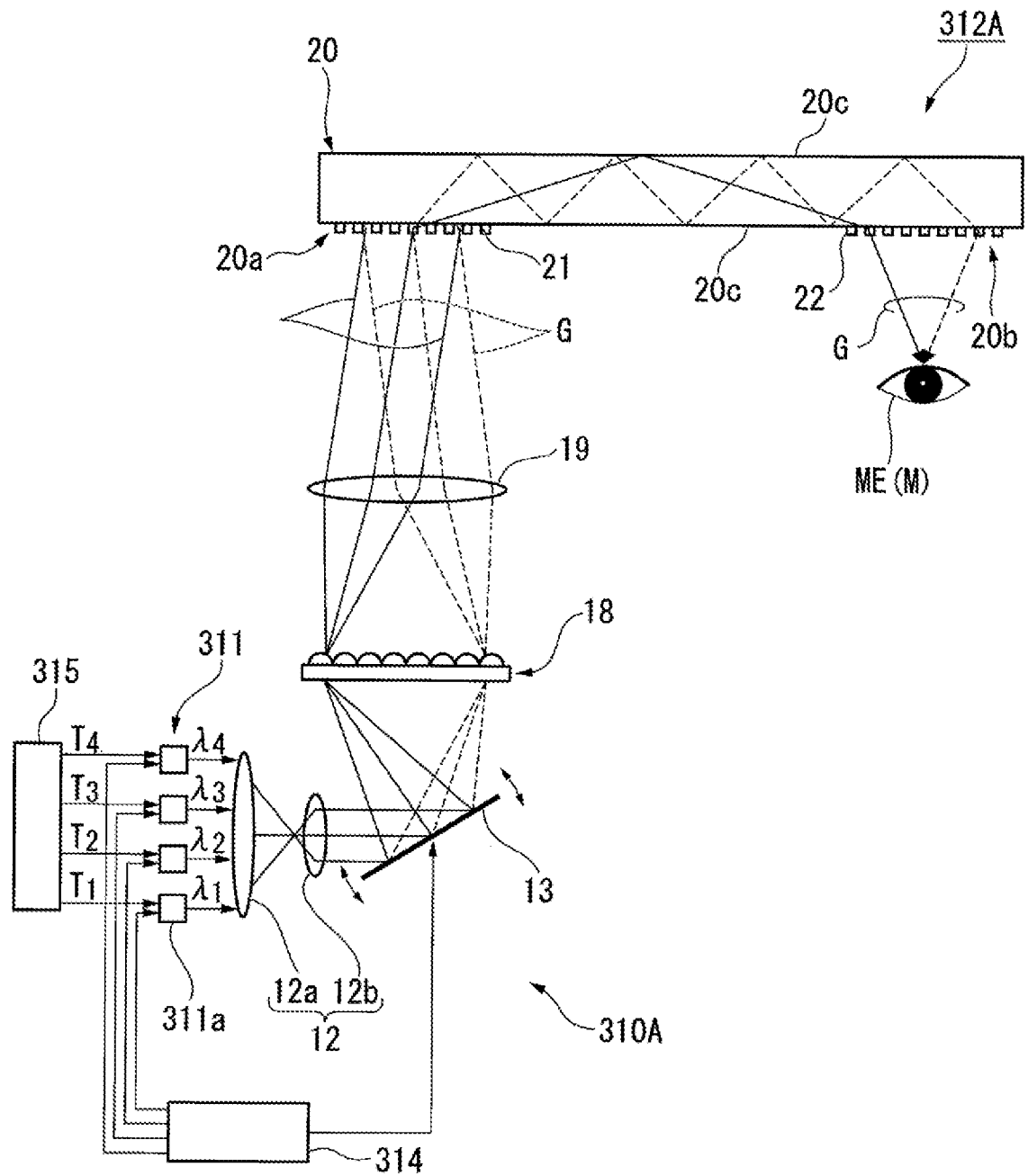
FIG. 10 is a horizontal cross-sectional diagram illustrating a schematic configuration of an image display unit of a fourth modified example.

FIG. 10 is a horizontal cross-sectional diagram illustrating a schematic configuration of an image display unit of the fourth modified example.

As illustrated in FIG. 10, an image display unit 312A of the fourth modified example includes an image light generating unit 310A, the exit pupil expander 18, the relay lens 19, the light-guiding plate 20, the incidence side diffraction element 21, and the emission side diffraction element 22.

The image light generating unit 310A includes the laser light source unit 311, the light converging optical system 12, the MEMS mirror 13, the driving circuit unit 314, and a temperature adjustment device 315. The temperature adjustment device 315 is configured to individually adjust the temperature of the semiconductor lasers 311a that constitute the laser light source unit 311. The temperature adjustment device 315 functions as the speckle noise reduction section configured to reduce the speckle noise in the image light G, as described below.

Figure 11A:
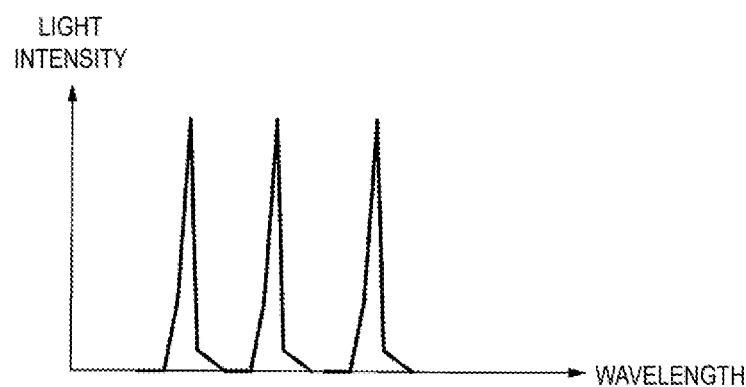
FIG. 11A is an explanatory illustration of a spectral distribution and a speckle noise of laser light.
Figure 11B:
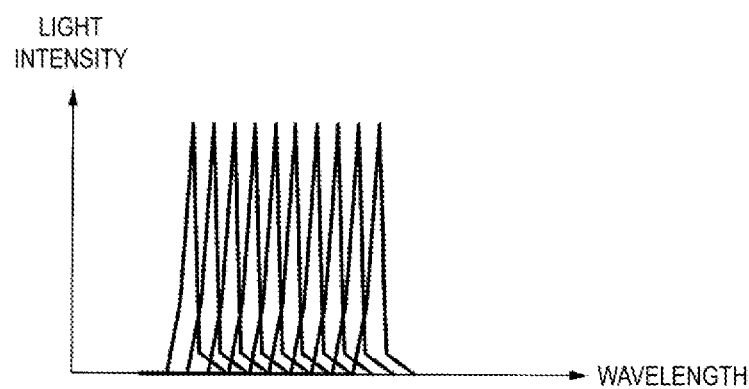
FIG. 11B is an explanatory illustration of a spectral distribution and a speckle noise of laser light.

FIGS. 11A and 11B are explanatory illustrations of a relationship between a spectral distribution and the speckle noise in laser light. FIG. 11A illustrates a discrete spectral distribution, and FIG. 11B illustrates a continuous spectral distribution. Note that in FIGS. 11A and 11B, the horizontal axis indicates the wavelength of the laser light, and the vertical axis indicates the light intensity of the laser light.

The laser light emitted from the laser light source unit 311, when having a top hat-type spectral distribution varying continuously and with uniform light intensities at each of the wavelengths as illustrated in FIG. 11B, increases the randomness of the speckle noise to reduce the visibility of speckle, compared to when having the discrete spectral distribution as illustrated in FIG. 11A.

Note that it is also possible to achieve the continuously varying spectral distribution illustrated in FIG. 11B by applying a temperature gradient to the laser array light source that emits light of a single wavelength, however, another issue arises in that the light intensity of the laser light emitted when an adjusted temperature is high becomes reduced.

In contrast, the image light generating unit 310A of the fourth modified example causes the temperature adjustment device 315 to apply the temperature gradient to the semiconductor lasers 311a that constitute the multi-wavelength array light source, thus achieving the top hat-type spectral distribution illustrated in FIG. 11B while suppressing an influence of reducing an intensity of the laser light by narrowing a temperature gradient range to suppress the adjusted temperature, to thus effectively reduce the speckle noise.

Fifth Modified Example

Next, the fifth modified example of the present disclosure will be described. This modified example is another modified example related to the third embodiment. Hereinafter, configurations and members common to the third embodiment will be denoted by identical reference signs and the detailed description will be omitted.

Figure 12:
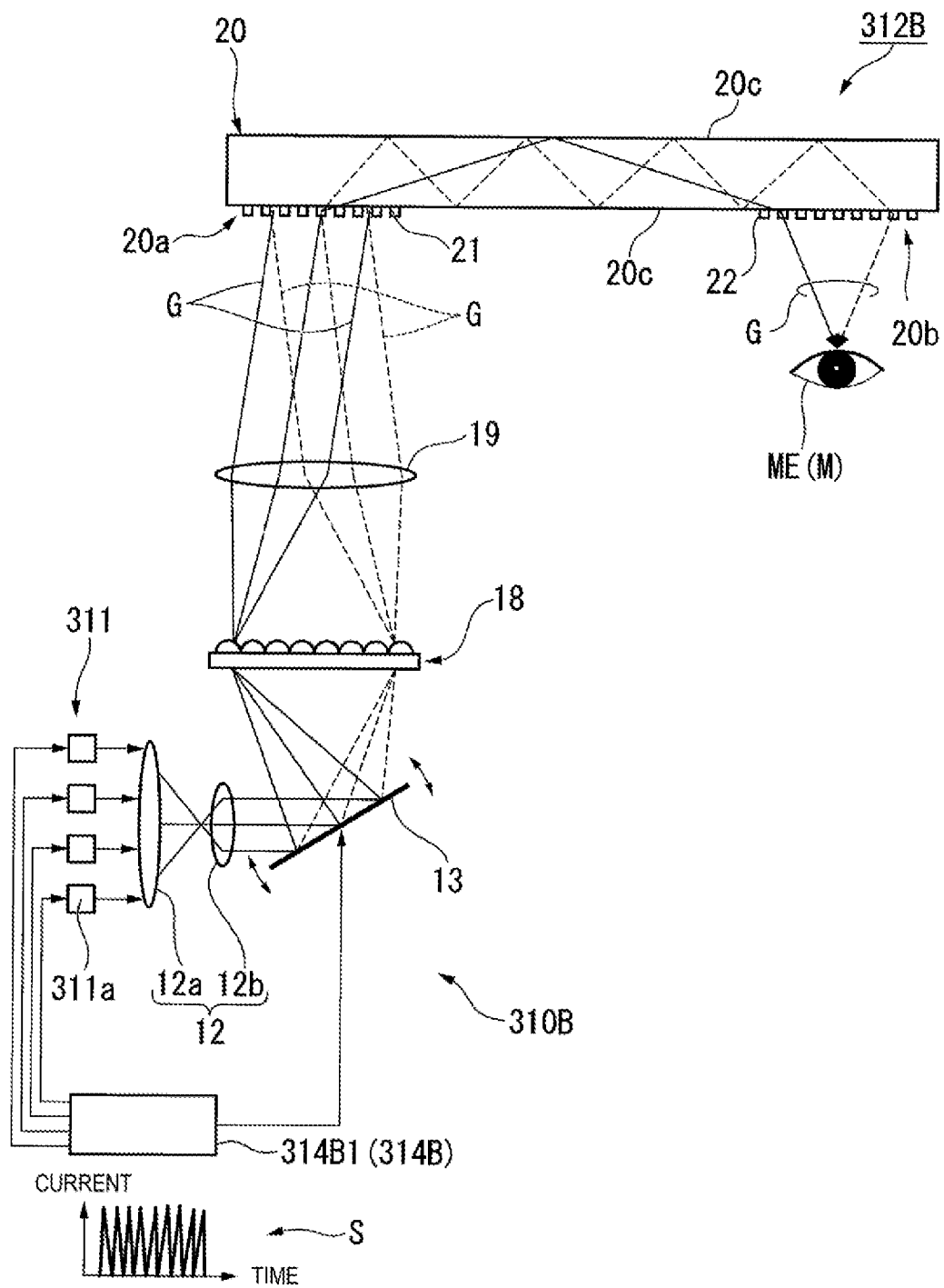
FIG. 12 is a horizontal cross-sectional diagram illustrating a schematic configuration of an image display unit of a fifth modified example.

FIG. 12 is a horizontal cross-sectional diagram illustrating a schematic configuration of an image display unit of the fifth modified example.

As illustrated in FIG. 12, an image display unit 312B of the fifth modified example includes an image light generating unit 310B, the exit pupil expander 18, the relay lens 19, the light-guiding plate 20, the incidence side diffraction element 21, and the emission side diffraction element 22.

The image light generating unit 310B includes the laser light source unit 311, the light converging optical system 12, the MEMS mirror 13, and a driving circuit unit 314B. The image light generating unit 310B of the fifth modified example includes a high-frequency wave superimposing circuit 314B1. The high-frequency wave superimposing circuit 314B1 is included in the driving circuit unit 314B. The high-frequency wave superimposing circuit 314B1 is configured to superimpose the high-frequency wave signal on driving currents of the semiconductor lasers 311a that constitute the laser light source unit 311.

According to the image light generating unit 310B of the fifth modified example, a synergistic effect due to speckle reduction by the laser light source unit 311 serving as the multi-wavelength array light source and the speckle reduction by the multi-mode oscillation caused by high-frequency wave superimposing increases the randomness of the speckle noise and to further flatten the speckle noise, to thus reduce the speckle noise.

Sixth Modified Example

Next, the sixth modified example of the present disclosure will be described. This modified example is another modified example related to the third embodiment. Hereinafter, configurations and members common to the third embodiment will be denoted by identical reference signs and the detailed description will be omitted.

Figure 13:
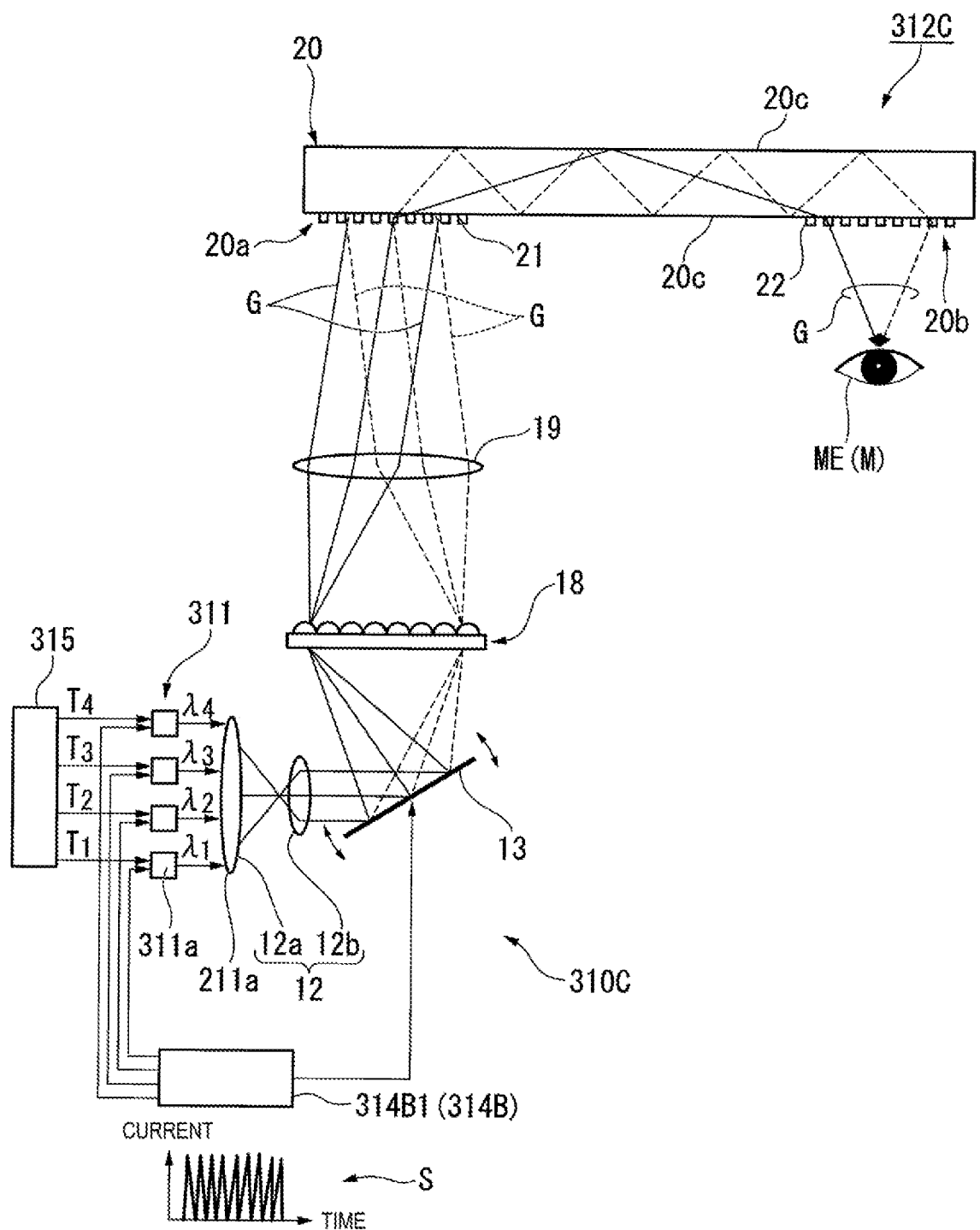
FIG. 13 is a horizontal cross-sectional diagram illustrating a schematic configuration of an image display unit of a sixth modified example.

FIG. 13 is a horizontal cross-sectional diagram illustrating a schematic configuration of an image display unit of the sixth modified example.

As illustrated in FIG. 13, an image display unit 312C of the sixth modified example includes an image light generating unit 310C, the exit pupil expander 18, the relay lens 19, the light-guiding plate 20, the incidence side diffraction element 21, and the emission side diffraction element 22. The image light generating unit 310C includes the laser light source unit 311, the light converging optical system 12, the MEMS mirror 13, the driving circuit unit 314B, and the temperature adjustment device 315.

According to the image light generating unit 310C of the sixth modified example, a synergistic effect due to the speckle reduction by the laser light source unit 311 serving as the multi-wavelength array light source, the speckle reduction by the multi-mode oscillation caused by high-frequency wave superimposing, and speckle reduction by a wavelength shift due to a temperature adjustment of the semiconductor lasers 311a of the laser light source unit 311 increases the randomness of the speckle noise and to further flatten the speckle noise, to thus reduce the speckle noise.

Fourth Embodiment

Next, the fourth embodiment of the present disclosure will be described.

The basic configuration of a display apparatus of the fourth embodiment is similar to that of the first embodiment except for the configuration of the image display unit. Hereinafter, a description of the image display unit will be given while the description of the overall configuration of the display apparatus is omitted. Note that configurations and members common to the first embodiment will be denoted by identical reference signs and the detailed description will be omitted.

Figure 14:
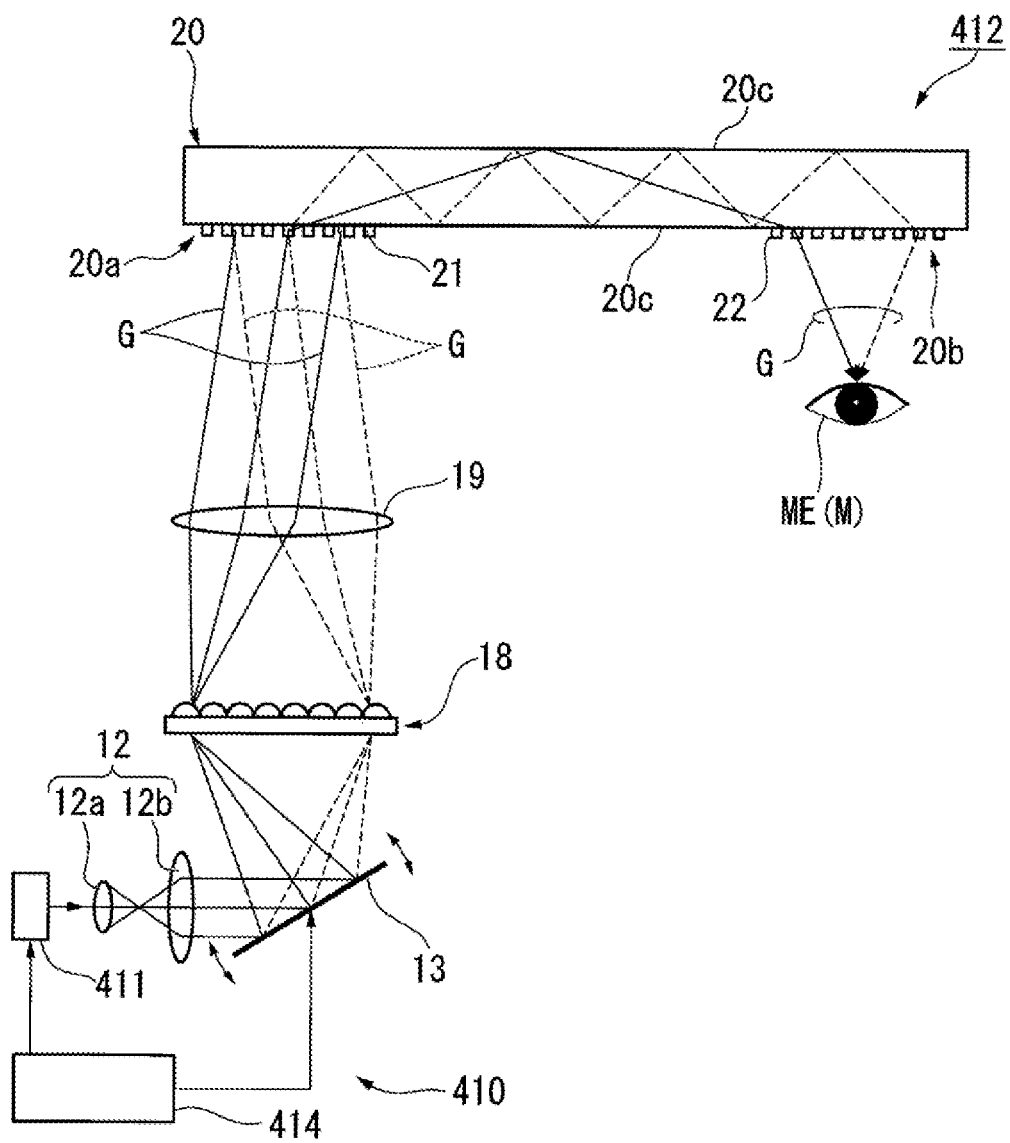
FIG. 14 is a horizontal cross-sectional diagram illustrating a schematic configuration of an image display unit of a fourth embodiment.

FIG. 14 is a horizontal cross-sectional diagram illustrating a schematic configuration of an image display unit of the fourth embodiment.

As illustrated in FIG. 14, an image display unit 412 of the fourth embodiment includes an image light generating unit 410, the exit pupil expander 18, the relay lens 19, the light-guiding plate 20, the incidence side diffraction element 21, and the emission side diffraction element 22.

The image light generating unit 410 includes a laser light source unit 411, the light converging optical system 12, the MEMS mirror 13, and a driving circuit unit 414. In the fourth embodiment, the driving circuit unit 414 includes a circuit for driving the laser light source unit 411 and controlling the rotation angle of the MEMS mirror 13, and does not include the high-frequency wave superimposing circuit.

The laser light source unit 411 of the fourth embodiment serves as a self-oscillating laser (self-pulsation LD). The self-oscillating laser can be repeatedly turned ON/OFF at a frequency of several 100 MHz by the semiconductor laser alone without using the high-frequency wave superimposing circuit, to thus achieve the multi-mode oscillation state as in the high-frequency wave superimposing process. Specifically, the self-oscillating laser is a light source that is characterized by being provided with a supersaturated absorber near an active layer in a structure of a normal semiconductor laser, in which while the supersaturated absorber absorbs carriers to prevent a laser oscillation immediately after a start of injecting the carriers into the active layer, the absorption by the supersaturated absorber saturates when the carriers have been continuously injected to some extent, reaching a laser oscillation. However, when the carriers are consumed at once immediately after the laser oscillation, the absorption by the supersaturated absorber occurs again, and the laser oscillation repeatedly stops at several hundred MHz.

As such, the image light generating unit 410 of the fourth embodiment, which includes the laser light source unit 411 constituted by the self-oscillating laser, can reduce the generation of the speckle noise in the image light G without using the high-frequency wave superimposing circuit. That is, in the image light generating unit 410 of the fourth embodiment, the laser light source unit 411 constituted by the self-oscillating laser functions as the speckle noise reduction section configured to reduce the speckle noise in the image light G. Thus, the image light generating unit 410 of the fourth embodiment includes the speckle noise reduction section.

As described above, the image display unit 412 of the fourth embodiment, which includes the laser light source unit 411 composed of the self-oscillating laser, can suppress the deterioration of image quality due to the speckle noise. The image display unit 412 of the fourth embodiment, which can reduce the speckle noise without using the high-frequency wave superimposing circuit, is also able to miniaturize a device configuration compared to a structure using the high-frequency wave superimposing circuit.

The image display unit 412 of the fourth embodiment further allows the exit pupil expander 18 to expand the size of the exit pupil formed with the image light G while suppressing the generation of the speckle noise.

Thus, the display apparatus including the image display unit 412 of the fourth embodiment allows the eyes of the observer to visually recognize the image light G having high quality with reduced speckle noise in a wide range.

Fifth Embodiment

Next, the fifth embodiment of the present disclosure will be described.

The basic configuration of a display apparatus of the fifth embodiment is similar to that of the first embodiment except for the configuration of the image display unit. Hereinafter, a description of the image display unit will be given while the description of the overall configuration of the display apparatus is omitted. Note that configurations and members common to the first embodiment will be denoted by identical reference signs and the detailed description will be omitted.

Figure 15:
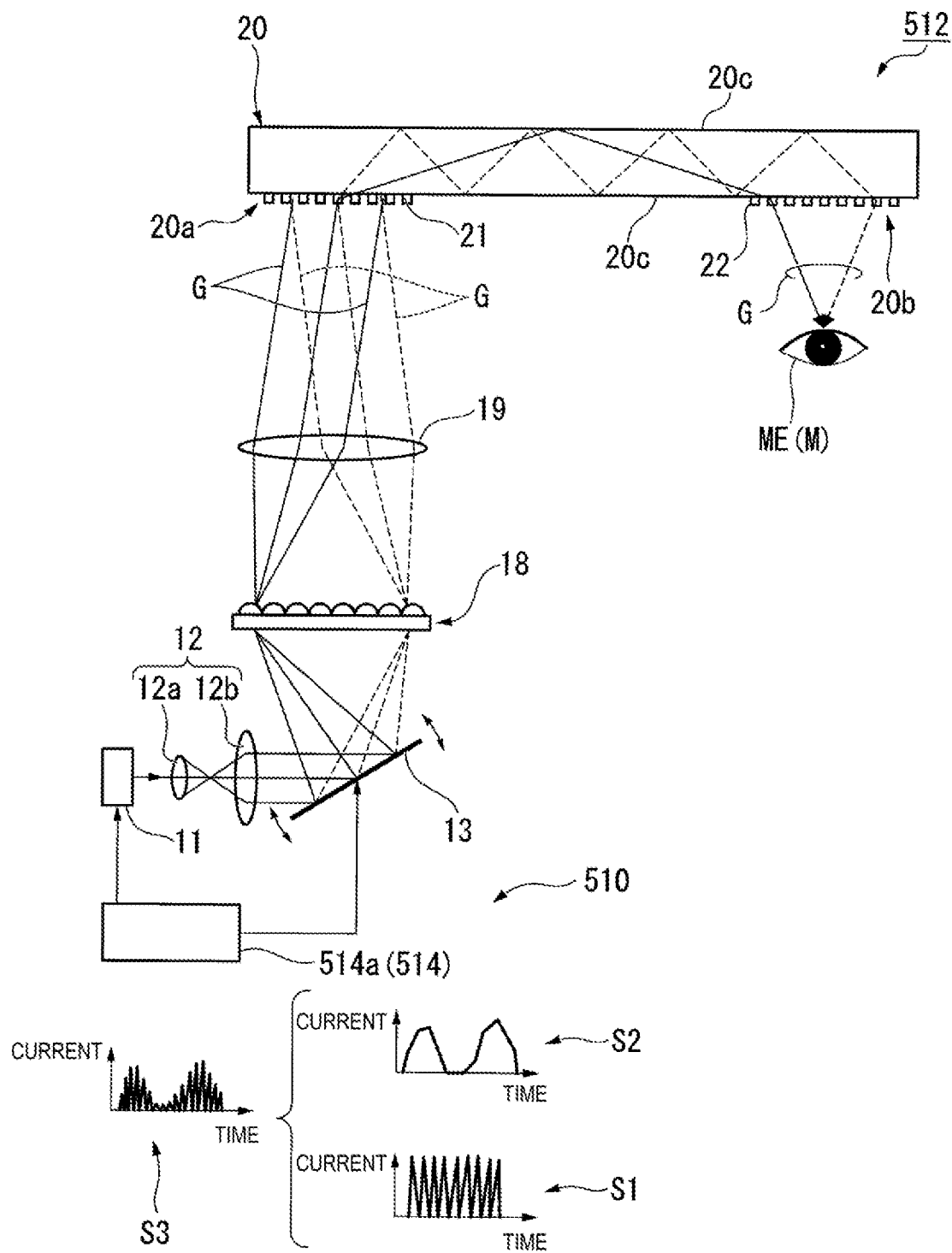
FIG. 15 is a horizontal cross-sectional diagram illustrating a schematic configuration of an image display unit of a fifth embodiment.

FIG. 15 is a horizontal cross-sectional diagram illustrating a schematic configuration of an image display unit of the fifth embodiment.

As illustrated in FIG. 15, an image display unit 512 of the fifth embodiment includes an image light generating unit 510, the exit pupil expander 18, the relay lens 19, the light-guiding plate 20, the incidence side diffraction element 21, and the emission side diffraction element 22.

The image light generating unit 510 includes the laser light source unit 11, the light converging optical system 12, the MEMS mirror 13, and a driving circuit unit 514. In the fifth embodiment, the driving circuit unit 514 controls driving of the laser light source unit 11 and the rotation angle of the MEMS mirror 13. The driving circuit unit 514 includes a high-frequency wave superimposing circuit 514a as a means configured to reduce high coherence at the laser light source unit 11.

Figure 16:
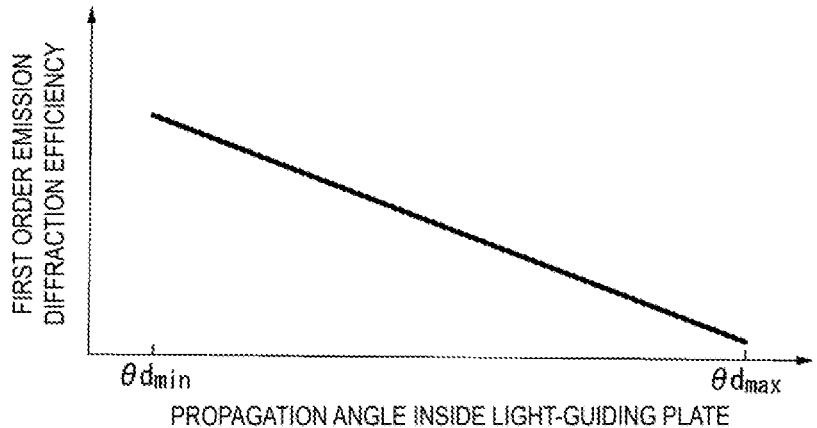
FIG. 16 is a chart illustrating a relationship between a propagation angle and a diffraction efficiency of an emission side diffraction element.

Incidentally, a diffraction efficiency of the emission side diffraction element 22 varies depending on a magnitude of the propagation angle at which the image light G propagates inside the light-guiding plate 20. FIG. 16 is a chart illustrating a relationship between a propagation angle inside light-guiding plate and a diffraction efficiency of an emission side diffraction element. Specifically, FIG. 16 is a chart illustrating a propagation angle dependency inside light-guiding plate of the diffraction efficiency of the emission side diffraction element 22.

In FIG. 16, the horizontal axis indicates the propagation angle at which the image light G propagates in the light-guiding plate 20, and the vertical axis indicates a first order diffraction efficiency of the emission side diffraction element 22. Note that the first order diffraction efficiency of the emission side diffraction element 22 represents a ratio of a first order diffraction light emitted from the light-guiding plate 20 to the outside by being diffracted by the emission side diffraction element 22.

As illustrated in FIG. 16, the emission side diffraction element 22, which has a high first order diffraction efficiency with respect to the image light G propagating, inside the light-guiding plate 20, at a small propagation angle, that is, at an angle close to the minimum propagation angle $\theta d_{min}$ illustrated in FIG. 4, emits the image light G to the outside with high efficiency. The emission side diffraction element 22, which also has a low first order diffraction efficiency with respect to the image light G propagating, inside the light-guiding plate 20, at a large propagation angle, that is, at an angle close to the maximum propagation angle $\theta d_{max}$ illustrated in FIG. 4, emits the image light G to the outside with reduced amount.

Also, the incidence side diffraction element 21 has a characteristic as in the emission side diffraction element 22, where an incidence diffraction efficiency of the image light G into the light-guiding plate 20 depends on an incidence angle at which the image light G is incident on the light-guiding plate 20.

Here, a relationship between the propagation angle inside light-guiding plate and an amount of light incident on a pupil in the light-guiding plate structure using a surface relief-type diffraction element as in the fifth embodiment will be described.

Figure 17:
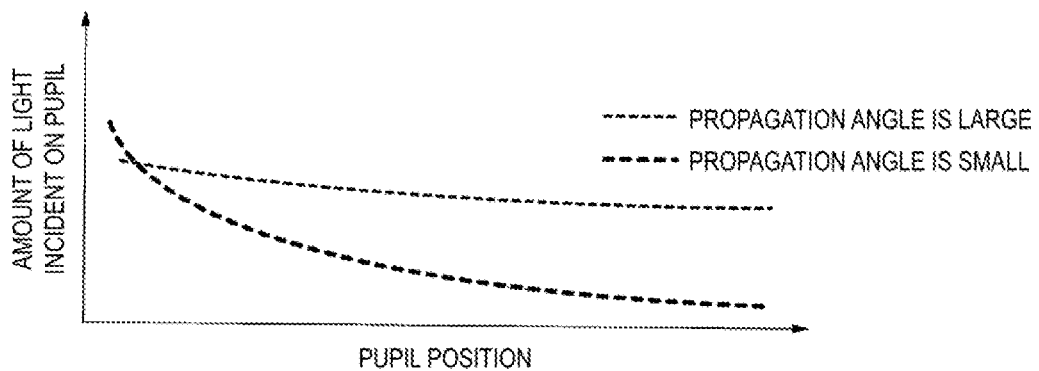
FIG. 17 is a chart illustrating a relationship between a propagation angle inside light-guiding plate and an amount of light incident on a pupil.

FIG. 17 is a chart illustrating the relationship between the propagation angle inside light-guiding plate and the amount of light incident on the pupil. In FIG. 17, the horizontal axis corresponds to a pupil position of the observer, and the vertical axis corresponds to the amount of light incident on the pupil.

As illustrated in FIG. 17, a difference occurs in the amount of light incident on the pupil of the observer depending on a magnitude of the propagation angle at which the light propagates inside the light-guiding plate 20.

Here, the propagation angle at which the image light propagates corresponds to a view angle when the light is incident on the pupil. That is, as illustrated in FIG. 17, when the amount of light incident on the pupil varies depending on the magnitude of the propagation angle, an in-plane intensity unevenness occurs in the image light observed by the observer, to deteriorate an image quality.

In contrast, the image light generating unit 510 of the fifth embodiment, which controls the intensity of the laser light for generating the image light G depending on the magnitude of the propagation angle inside light-guiding plate for determining the view angle of the image light G, reduces the in-plane intensity unevenness.

As described above, the propagation angle at which light propagates inside the light-guiding plate 20 is determined by the incidence angle at which the image light G is incident on the incidence side diffraction element 21. The incidence angle at which the image light G is incident on the incidence side diffraction element 21 is determined by a rotation angle of the MEMS mirror 13.

The image light generating unit 510 of the fifth embodiment is configured to control an output of the laser light emitted from the laser light source unit 11 based on information about the rotation angle of the MEMS mirror 13.

In the image light generating unit 510 of the fifth embodiment, the information about the rotation angle of the MEMS mirror 13 and information about a drive frequency of the MEMS mirror 13 are fed back to the high-frequency wave superimposing circuit 514a of the driving circuit unit 514. The high-frequency wave superimposing circuit 514a is configured to control the output of the laser light emitted from the laser light source unit 11 based on the information about the rotation angle of the MEMS mirror 13 and the information about the drive frequency of the MEMS mirror 13. The high-frequency wave superimposing circuit 514a of the driving circuit unit 514 is configured to supply a signal S3 obtained by superimposing a drive frequency signal S2 of a kHz order of the MEMS mirror 13 on a high-frequency superimposing signal S1 of several 100 MHz, as illustrated in FIG. 15.

The driving circuit unit 514 is configured to reduce a driving current corresponding to the rotation angle of the MEMS mirror 13 that generates light of a view angle at which the light is incident with high intensity on the pupil of the observer, and is configured to increase the driving current corresponding to the rotation angle of the MEMS mirror 13 that generates light of a view angle at which the light is incident with low intensity on the pupil of the observer.

Figure 18:
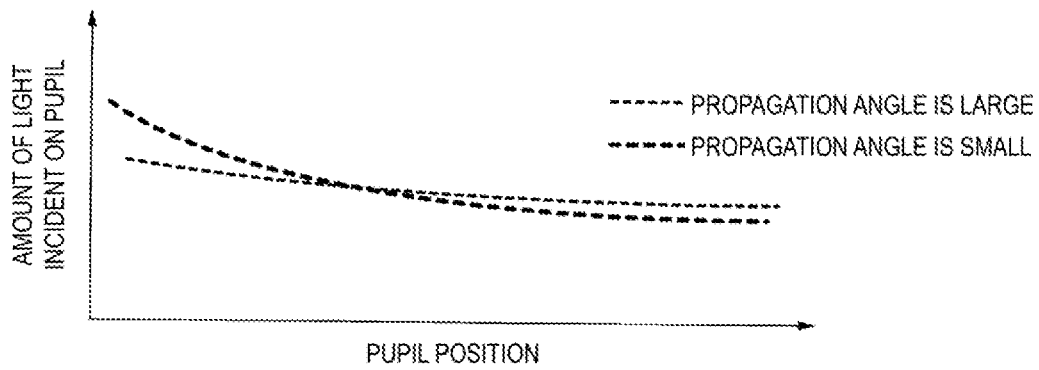
FIG. 18 is a chart illustrating a relationship between a propagation angle after performing feedback control and an amount of light incident on a pupil.

FIG. 18 is a chart illustrating a relationship between the propagation angle inside light-guiding plate and the amount of light incident on the pupil after a feedback control of the driving circuit unit 514. According to the image display unit 512 of the fifth embodiment, the driving circuit unit 514 performs the feedback control in the image light generating unit 510, to thus reduce a difference in the amount of light incident on the pupil depending on the magnitude of the propagation angle and reduce the in-plane intensity unevenness of the image light G, as illustrated in FIG. 18.

As described above, the image display unit 512 of the fifth embodiment, which includes the image light generating unit 510 configured to control the output of the laser light emitted from the laser light source unit 11 based on the information about the rotation angle of the MEMS mirror 13, to thus suppress the deterioration of image quality due to the speckle noise and reduce the in-plane intensity unevenness of the image light G.

The image display unit 512 of the fifth embodiment also allows the exit pupil expander 18 to expand the size of the exit pupil formed with the image light G while suppressing the generation of the speckle noise.

Thus, the display apparatus including the image display unit 512 of the fifth embodiment allows the eyes of the observer to visually recognize the image light G having high quality with reduced speckle noise in a wide range.

Sixth Embodiment

Next, the sixth embodiment of the present disclosure will be described.

The basic configuration of a display apparatus of the sixth embodiment is similar to that of the first embodiment, except for the configuration of the image display unit. Hereinafter, a description of the image display unit will be given while the description of the overall configuration of the display apparatus is omitted. Note that configurations and members common to the first embodiment will be denoted by identical reference signs and the detailed description will be omitted.

Figure 19:
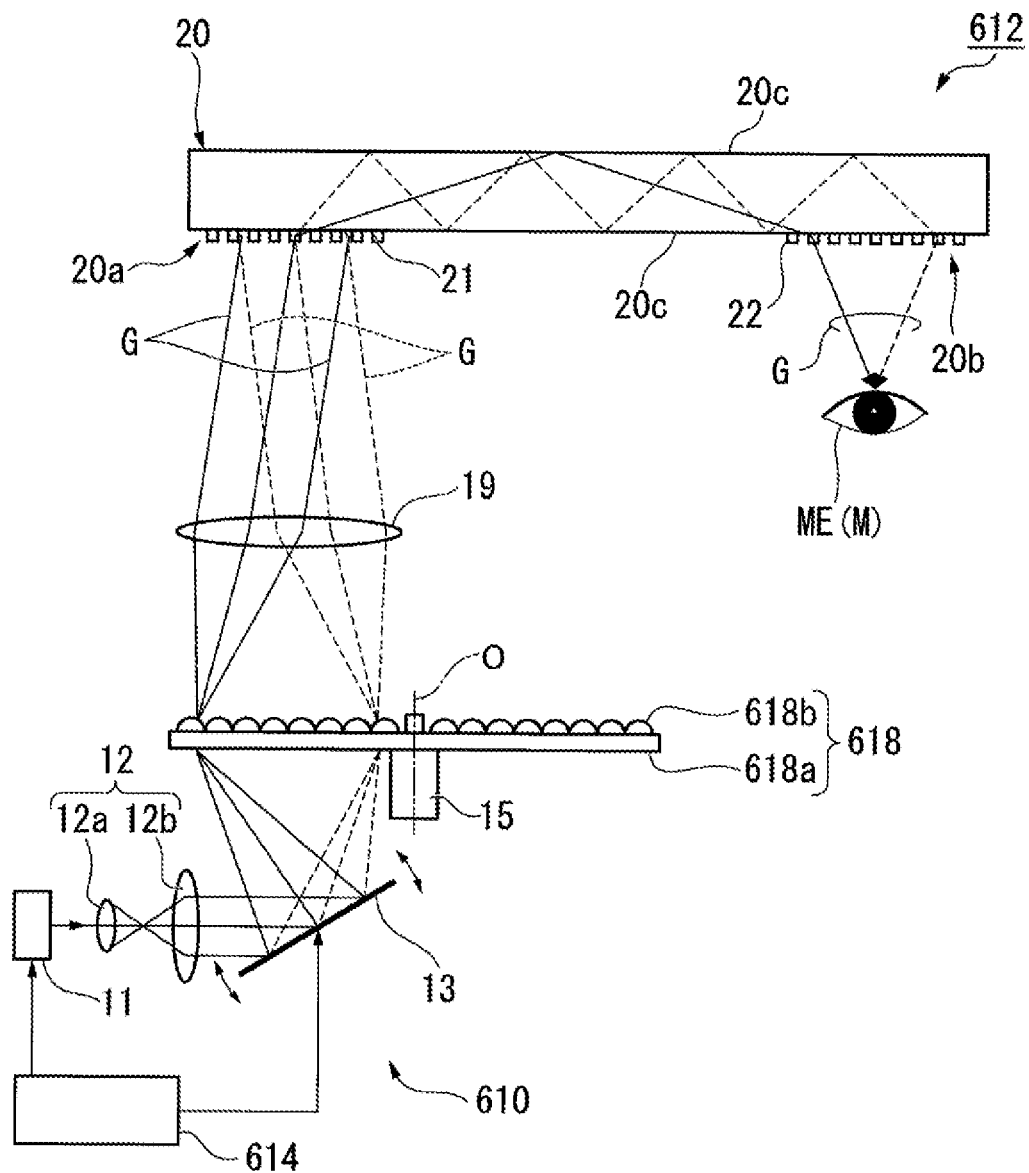
FIG. 19 is a horizontal cross-sectional diagram illustrating a schematic configuration of an image display unit of a sixth embodiment.

FIG. 19 is a horizontal cross-sectional diagram illustrating a schematic configuration of an image display unit of the sixth embodiment.

As illustrated in FIG. 19, an image display unit 612 of the sixth embodiment includes an image light generating unit 610, an exit pupil expander 618, a movement device 15, the relay lens 19, the light-guiding plate 20, the incidence side diffraction element 21, and the emission side diffraction element 22.

The image light generating unit 610 includes the laser light source unit 11, the light converging optical system 12, the MEMS mirror 13, and a driving circuit unit 614. In the sixth embodiment, the driving circuit unit 614 includes a circuit for driving the laser light source unit 11 and controlling the rotation angle of the MEMS mirror 13, and does not include the high-frequency wave superimposing circuit.

The exit pupil expander 618 includes a circular plate 618a having translucency and a microlens array 618b provided at a face of the circular plate 618a.

The movement device 15 is a device configured to cause the exit pupil expander 618 to move. In the sixth embodiment, the movement device 15 is constituted by a motor, for example. The movement device 15, which is attached to the circular plate 618a of the exit pupil expander 618, causes the circular plate 618a to rotate about a predetermined rotation axis O.

The image light generating unit 610 of the sixth embodiment, which allows the movement device 15 to rotate the exit pupil expander 618 serving as a source of speckle noise, causes the speckle pattern to vary in accordance with the rotation as well. The varied speckle pattern is superimposed within an integration time of a human eye to be averaged, to thus reduce the speckle. That is, in the image light generating unit 610 of the sixth embodiment, the movement device 15 functions as the speckle noise reduction section configured to reduce the speckle noise in the image light G.

Thus, the display apparatus including the image light generating unit 610 of the sixth embodiment allows the eyes of the observer to visually recognize the image light G having high quality with reduced speckle noise in a wide range.

Note that the configurations of the first to fifth embodiments and the first to sixth modified examples may be combined with the configuration of the sixth embodiment. That is, in each of the configurations, the exit pupil expander may be caused to rotate. This configuration makes it possible to further reduce the speckle noise in the image light G.

Seventh Modified Example

Next, the seventh modified example of the present disclosure will be described. This modified example is another modified example related to the sixth embodiment. Hereinafter, configurations and members common to the sixth embodiment will be denoted by identical reference signs and the detailed description will be omitted.

Figure 20:
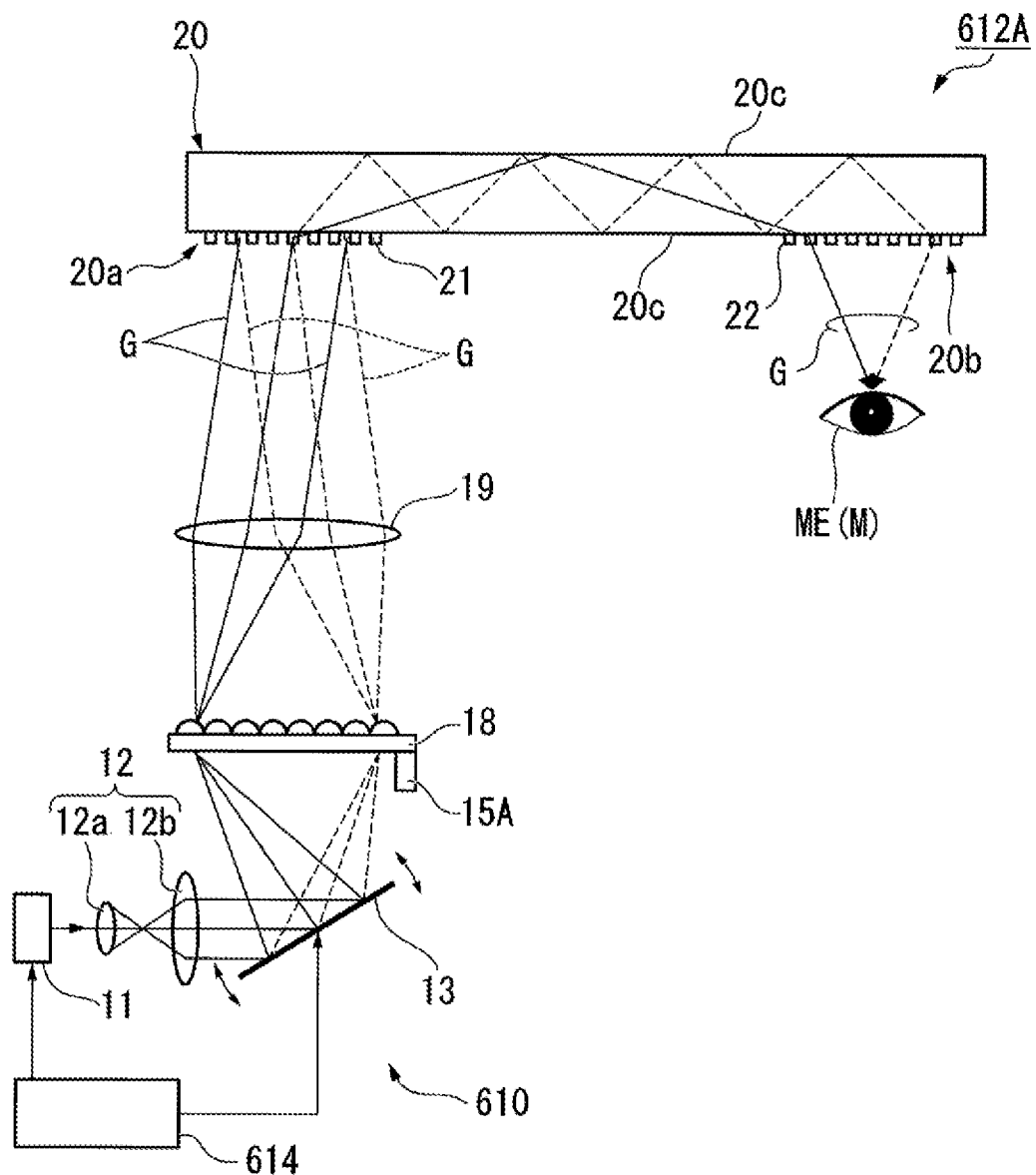
FIG. 20 is a horizontal cross-sectional diagram illustrating a schematic configuration of an image display unit of a seventh modified example.

FIG. 20 is a horizontal cross-sectional diagram illustrating a schematic configuration of an image display unit of the seventh modified example.

As illustrated in FIG. 20, an image display unit 612A of the seventh modified example includes the image light generating unit 610, the exit pupil expander 18, a movement device 15A, the relay lens 19, the light-guiding plate 20, the incidence side diffraction element 21, and the emission side diffraction element 22.

In the seventh modified example, the movement device 15A is a device configured to cause the exit pupil expander 18 to move. In the seventh modified example, the movement device 15A is constituted by an oscillation motor, for example. The exit pupil expander 18 may be provided with a plurality of the movement device 15A.

When employing a configuration in which the exit pupil expander is caused to rotate as in the sixth embodiment as a means for time changing the speckle pattern, an identical speckle pattern is repeated after the exit pupil expander has rotated for one time. In contrast, according to the image display unit 612A of the seventh modified example, a plurality of the oscillation motors are arranged inside the exit pupil expander 18, where the oscillating directions and the periods are caused to shift from one another, to thus prevent the speckle pattern from being repeatedly displayed. This enables more number of patterns to be averaged within an integration time of an eye, to thus effectively reduce the speckle noise.

Note that the configurations of the first to fifth embodiments and the first to sixth modified examples may be combined with the configuration of the seventh modified example. That is, in each of the configurations, the exit pupil expander may be caused to oscillate. This configuration makes it possible to further reduce the speckle noise in the image light G.

Note that the technical scope of the present disclosure is not limited to the above-described embodiments, and various modifications can be made to the above-described embodiments without departing from the spirit and gist of the present disclosure.

For example, although in the embodiments described above, an example is given of a display apparatus of a see-through scheme, the present disclosure is also applicable to a display apparatus that does not have see-through properties.

Further, in the image display unit of the embodiments described above and the modified examples described above, an example is given of a case in which the image light G is guided in the left/right direction inside the light-guiding plate 20 to be incident on an eye, however, the light-guiding plate 20 may be disposed such that the image light G propagates in the vertical direction to be incident on the eye. In addition, a light-guiding plate may be used, which has a shape such that the image light G is guided in the lateral direction and is then guided in the vertical direction to be emitted toward the eye of the observer.

What is claimed is:

1. A display apparatus, comprising:

an image light generating unit including a laser light source unit, a MEMS mirror configured to reflect laser light emitted from the laser light source unit, and a light converging optical system configured to guide the laser light emitted from the laser light source unit to the MEMS mirror, the image light generating unit being configured to generate image light;

an exit pupil expander configured to expand a luminous flux diameter of the image light from the image light generating unit;

a light-guiding plate;

a first surface relief-type diffraction grating provided at a light incidence portion of the light-guiding plate and on which the image light passing through the exit pupil expander is incident and enters the light-guiding plate; and a second surface relief-type diffraction grating provided at a light emission portion of the light-guiding plate and through which the image light propagating inside the light-guiding plate exits, wherein the image light generating unit includes a speckle noise reduction section configured to reduce speckle noise in the image light.

2. The display apparatus according to claim 1, wherein the speckle noise reduction section includes a high-frequency wave superimposing circuit configured to perform a high-frequency wave superimposing process on the laser light source unit.

3. The display apparatus according to claim 1, wherein the speckle noise reduction section includes a temperature adjustment device configured to perform temperature adjustment on the laser light source unit.

4. The display apparatus according to claim 1, wherein the image light generating unit is configured to control an output of the laser light emitted from the laser light source unit based on information about a rotation angle of the MEMS mirror.

5. The display apparatus according to claim 1, wherein the laser light source unit includes a plurality of laser light sources configured to emit the laser light in an identical wavelength.

6. The display apparatus according to claim 1, wherein the laser light source unit includes a plurality of laser light sources configured to emit the laser light in different wavelengths.

7. The display apparatus according to claim 1, wherein the laser light source unit is a self-oscillating laser.

8. A display apparatus, comprising:

an image light generating unit including a laser light source unit and a MEMS mirror, the laser light source unit being configured to emit image light composed of laser light and the MEMS mirror being configured to reflect the image light;

an exit pupil expander configured to expand a luminous flux diameter of the image light from the image light generating unit;

a movement device configured to move the exit pupil expander in a direction that intersects an optical axis of the image light emitted from the image light generating unit;

a light-guiding plate;

an incidence side diffraction element provided at a light incidence portion of the light-guiding plate and on which the image light passing through the exit pupil expander is incident and enters the light-guiding plate; and an emission side diffraction element provided at a light emission portion of the light-guiding plate and through which the image light propagating inside the light-guiding plate exits.

* * * * *